US012117796B2

(12) United States Patent
Jiang et al.

(10) Patent No.: US 12,117,796 B2
(45) Date of Patent: Oct. 15, 2024

(54) METHODS FOR QUICKLY OPTIMIZING GEOMETRIC ERROR COMPENSATION DATA OF TRANSLATIONAL AXES OF FIVE-AXIS NUMERICALLY CONTROLLED MACHINE TOOLS

(71) Applicant: CHENGDU AIRCRAFT INDUSTRIAL (GROUP) CO., LTD., Sichuan (CN)

(72) Inventors: Yunfeng Jiang, Chengdu (CN); Jie Li, Chengdu (CN); Wenjian Tao, Chengdu (CN); Jinlong Hu, Chengdu (CN); Wenping Mou, Chengdu (CN); Zhiyong Song, Chengdu (CN); Ying Li, Chengdu (CN); Lianyu Li, Chengdu (CN); Wangwei Chu, Chengdu (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 17 days.

(21) Appl. No.: 18/452,536

(22) Filed: Aug. 20, 2023

(65) Prior Publication Data
US 2024/0019839 A1 Jan. 18, 2024

Related U.S. Application Data

(63) Continuation-in-part of application No. PCT/CN2021/136929, filed on Dec. 10, 2021.

(30) Foreign Application Priority Data

Feb. 19, 2021 (CN) .......................... 202110188752.5

(51) Int. Cl.
*G05B 19/408* (2006.01)

(52) U.S. Cl.
CPC .. *G05B 19/408* (2013.01); *G05B 2219/31337* (2013.01)

(58) Field of Classification Search
None
See application file for complete search history.

(56) References Cited

U.S. PATENT DOCUMENTS

2010/0299094 A1 11/2010 Hsu
2011/0224958 A1 9/2011 Yang et al.
(Continued)

FOREIGN PATENT DOCUMENTS

CN 103048968 A 4/2013
CN 105278457 A 1/2016
(Continued)

OTHER PUBLICATIONS

First Office Action in Chinese Application No. 202110188752.5 mailed on Apr. 2, 2021, 18 pages.
(Continued)

*Primary Examiner* — David Earl Ogg
(74) *Attorney, Agent, or Firm* — PORUS IP LLC

(57) ABSTRACT

The embodiment of the present disclosure provides a method for quickly optimizing geometric error compensation data of a translational axis of a five-axis numerically controlled machine tool. The method includes: 1) establishing a volumetric positioning error model; 2) establishing an error database; 3) constructing a volumetric error compensation table; 4) establishing a compensation data optimization model to form an optimization model of three face diagonals and one body diagonal in a translational axis linkage mode; 5) completing iterative optimization and selection of the correction coefficients; 6) completing compensation of the geometric errors of the five-axis numerically controlled machine tool; and 7) iterating error correc-
(Continued)

tion data to the error database, performing linkage trajectory detection, presetting a positioning error threshold, and cycling the operations 2) to 6) to realize a machine tool precision guarantee system for periodic detection, optimization, and compensation.

8 Claims, 8 Drawing Sheets

(56) References Cited

U.S. PATENT DOCUMENTS

| | | | |
|---|---|---|---|
| 2012/0253505 A1* | 10/2012 | Matsushita | G05B 19/401 700/193 |
| 2014/0364993 A1 | 12/2014 | Matsushita | |

FOREIGN PATENT DOCUMENTS

| | | | | |
|---|---|---|---|---|
| CN | 105538038 A | * | 5/2016 | |
| CN | 106141814 A | | 11/2016 | |
| CN | 106931915 A | | 7/2017 | |
| CN | 107368637 A | | 11/2017 | |
| CN | 107450473 A | | 12/2017 | |
| CN | 112558547 A | | 12/2017 | |
| CN | 107748539 A | | 3/2018 | |
| CN | 108415371 A | | 8/2018 | |
| CN | 108563186 A | | 9/2018 | |
| CN | 109375580 A | | 2/2019 | |
| CN | 109732402 A | | 5/2019 | |
| CN | 110109418 A | * | 8/2019 | G05B 19/404 |
| CN | 110270883 A | | 9/2019 | |
| CN | 111318802 A | | 6/2020 | |
| CN | 111338296 A | * | 6/2020 | G05B 19/41 |
| CN | 111580469 A | | 8/2020 | |
| CN | 111665784 A | | 9/2020 | |
| CN | 111797482 A | | 10/2020 | |
| CN | 112008492 A | | 12/2020 | |
| CN | 112051798 A | | 12/2020 | |
| JP | 2020038569 A | | 3/2020 | |
| WO | 2008113783 A2 | | 9/2008 | |

OTHER PUBLICATIONS

Decision to Grant a Patent in Chinese Application No. 202110188752.5 mailed on Apr. 9, 2021, 6 pages.
Li, Jie et al., A Laser Interferometer Based Linear Axes Squareness Error Identification Method for Large Gantry Machine Tools, Manufacturing Technology & Machine Tool, 10: 21-26, 2020.
Xu, Lianxiang et al., Error Identification and Compensation Research of CNC Machine Tool Translation Axis, Machine Tool & Hydraulics, 45(9): 68-71+125, 2017.
Zhang, Taotao, Error Identification and Compensation of CNC Machine Tool's Linear Axes, Chinese Master's Theses Full-text Database, Engineering Science and Technology I , 2015, 58 pages.
Ma, Chi et al., Thermal Error Compensation of Linear Axis with Fixed-Fixed Installation, International Journal of Mechanical Sciences, 2020, 22 pages.
International Search Report in PCT/CN2021/136929 mailed on Mar. 1, 2022, 6 pages.
Written Opinion in PCT/CN2021/136929 mailed on Mar. 1, 2022, 8 pages.

* cited by examiner

METHODS FOR QUICKLY OPTIMIZING GEOMETRIC ERROR COMPENSATION DATA OF TRANSLATIONAL AXES OF FIVE-AXIS NUMERICALLY CONTROLLED MACHINE TOOLS

CROSS REFERENCE TO RELATED APPLICATIONS

The present disclosure is a Continuation-in-part of International Patent Application No. PCT/CN2021/136929, filed on Dec. 10, 2021, which claims priority to Chinese Patent Application No. 202110188752.5, filed on Feb. 19, 2021, the entire contents of which are hereby incorporated by reference.

TECHNICAL FIELD

The present disclosure relates to the field of error optimization of a five-axis numerically controlled machine tool, and in particular, to methods for quickly optimizing geometric error compensation data of a translational axis of a five-axis numerically controlled machine tool.

BACKGROUND

Five-axis numerically controlled machine tools are widely used in aerospace, automobile and ships, medical equipment, and other fields, which greatly enhances the strength of China in basic manufacturing equipment. The machining precision of a five-axis numerically controlled machine tool is a key to ensuring the quality of workpieces. Among many error sources that affect the machining precision, a geometric error of the machine tool accounts for more than 50%, which has become an important part that restricts the improvement of machining precision.

At present, research on the geometric error of the five-axis numerically controlled machine tool is mainly divided into two aspects: identification and control of a geometric error of a translational axis and identification and control of a geometric error of a rotary axis. Since the translational axis is a most basic motion unit of the numerically controlled machine tool, and especially when a Realtime Transport Control Protocol (RTCP) function is turned on a five-axis machine tool, motion of the rotary axis also involves participation of the translational axis, a volumetric positioning precision of the translational axis affects a precision level of the rotary axis. In terms of research on the geometric error of the translational axis, both patent No. 201610055356 and patent No. 201910193297 complete the identification of the geometric error of the translational axis using a laser interferometer and directly compensate the geometric error of the translational axis based on the identification of the geometric error. However, the compensation effect is often unsatisfactory. A main reason is that a machining process of the machine tool is subject to complex and multi-factor dynamic action, and an identification process introduces a certain device random error, resulting in a large deviation between an identified error compensation value and an actually required compensation value. In practical engineering applications, people with rich technical experience are often required to repeatedly correct and experiment on a compensation value by judging a curve of compensation data, which has a relatively high level of manual involvement and leads to a relatively low level of automation of the compensation technology, thereby affecting the cycle and execution efficiency of an entire production task.

SUMMARY

In order to overcome the limitations of existing manners, based on a geometric error database of a numerically controlled machine tool and combined with a particle swarm optimization algorithm, the present disclosure proposes a method for quickly optimizing geometric error compensation data of a translational axis of a five-axis numerically controlled machine tool, which realizes a rapid compensation of the geometric error of the translational axis of the five-axis numerically controlled machine tool.

The present disclosure is realized through the following technical solution: the method for quickly optimizing geometric error compensation data of a translational axis of a five-axis numerically controlled machine tool. The method includes:

Step 1, establishing a volumetric positioning error model of a tool center point caused by geometric errors of the translational axis of the five-axis numerically controlled machine tool, wherein 18 geometric error vectors including three coordinate axes are: a positioning error $\delta_x(i)$, a Y-direction straightness error $\delta_y(i)$, a Z-direction straightness error $\delta_z(i)$, a roll error $\theta_\alpha(i)$, a pitch error $\theta_\beta(i)$, and a deflection error $\theta_\gamma(i)$, and X, Y, and Z denote operating positions of the coordinate axes within a travel range;

Step 2, establishing an error database of the 18 geometric error vectors including the three coordinate axes;

Step 2.1, identifying the geometric error of the translational axis through a thirteen trajectory line detection manner using a high-precision laser interferometer based on the volumetric positioning error model of the five-axis numerically controlled machine tool established in the operation (1);

Step 2.2, combining six geometric errors identified for each axis into a form of an error vector:

$$E_{1\times 18} = [\underbrace{\delta_x(X)_1, \ldots, \theta_\gamma(X)_1}_{\text{six items}}, \underbrace{\delta_x(Y)_1, \ldots, \theta_\gamma(Y)_1}_{\text{six items}}, \underbrace{\delta_x(Z)_1, \ldots, \theta_\gamma(Z)_1}_{\text{six items}}];$$

and

Step 2.3, extending each error into a position-dependent vector throughout a whole motion travel since the 18 geometric errors of the translational axis are interrelated with a motion position and dividing the motion position into N equal parts, wherein same geometric errors at different positions are all slightly different, and the error database of the translational axis of the numerically controlled machine tool is expressed as follows:

$$Ebase_{N\times 18} = \begin{bmatrix} \delta_x(X)_1, \ldots, \theta_\gamma(X)_1, \delta_x(Y)_1, \ldots, \theta_\gamma(Y)_1, \delta_x(Z)_1, \ldots, \theta_\gamma(Z)_1 \\ \ldots \\ \delta_x(X)_N, \ldots, \theta_\gamma(X)_N, \delta_x(Y)_N, \ldots, \theta_\gamma(Y)_N, \delta_x(Z)_N, \ldots, \theta_\gamma(Z)_N \end{bmatrix}$$

where Ebase denotes the geometric error database of the translational axis of the numerically controlled machine tool;

Step 3, constructing a volumetric error compensation table of a numerically controlled system; Step 4, establishing a compensation data optimization model of a volumetric positioning error of the translational axis, adding correction coefficients k and d to the geometric error vectors obtained in operation (2), and combining with a translational axis linkage trajectory positioning error model to form an optimization model of three face diagonals and one body diagonal in a translational axis linkage mode;

Step 4.1, adding the correction coefficients k and d to each error of the geometric error vectors obtained in the operation (2), wherein a basic form is as follows:

$$e\_Adjust = ke + d$$

where e denotes any one of the geometric error vectors, and e_Adjust denotes a corrected error, and an expression for correcting an entire geometric error vector is as follows:

$$Ebase\_Adjust_{N \times 18} = \begin{bmatrix} \underbrace{\delta_x(X)_1, \ldots, \theta_y(X)_1, \delta_x(Y)_1, \ldots, \underbrace{\theta_y(Y)_1, \delta_x(Z)_1, \ldots, \theta_y(Z)_1}_{k_1, d_1}}_{k_1, d_1} \\ \ldots \\ \underbrace{\delta_x(X)_N, \ldots, \theta_y(X)_N, \delta_x(Y)_N, \ldots, \underbrace{\theta_y(Y)_N, \delta_x(Z)_N, \ldots, \theta_y(Z)_N}_{k_1, d_1}}_{k_1, d_1} \end{bmatrix}$$

where $Ebase_{Adjust}$ is a corrected error database of the translational axis, $k_i$ and d denote correction coefficients required for an $i^{th}$ error, a purpose of adding the correction coefficients is to realize a dynamic change of each error vector within a certain range, i.e., to search for upper and lower bounds by relying on the correction coefficients $k_i$ and $d_i$, wherein $k_i$ mainly completes scaling adjustment of data, and $d_i$ completes overall offset adjustment of the data to complete approximation of a real error, and the adjustment is performed simultaneously on all the geometric errors to achieve an accurate error compensation;

Step 4.2, calculating positioning errors of four diagonals of an XY plane, an XZ plane, a YZ plane, and an XYZ body according to an expression of the volumetric positioning error of the tool center point obtained in operation (1);

Step 4.3, obtaining corrected positioning error of four diagonals by substituting the geometric error $Ebase_{Adjust}$ after the correction coefficients are added into the positioning errors of four diagonals calculated in the operation (4.2);

Step 4.4, obtaining machine tool linkage trajectory detection positioning error data by directly detecting the positioning errors of three face diagonals and one body diagonal during linkage of the translational axis using the laser interferometer; and Step 4.5, calculating differences between the operation (4.3) and the operation (4.4), and obtaining four optimization objectives of the diagonals by taking a smallest sum of squared differences as an optimization objective;

Step 5, numerically solving vectors K and D comprised of the correction coefficients k and d based on a particle swarm optimization algorithm to complete iterative optimization and selection of the correction coefficients;

Step 6, generating the volumetric error compensation table of the numerically controlled system by combining the correction coefficient vector obtained in the operation (5) and the geometric error vector with the operation (3) and completing compensation of the geometric errors of the five-axis numerically controlled machine tool; and Step 7, iterating error correction data to the error database in the operation (2), performing linkage trajectory detection on the volumetric positioning error of the translational axis by setting a fixed period, presetting a positioning error threshold, and cycling the operations (2) to (6) to realize a machine tool precision guarantee system for periodic detection, optimization, and compensation.

In order to better realize the method of the present disclosure, a CA double pendulum head vertical five-axis numerically controlled machine tool is taken as an example and the volumetric positioning error model of the tool center point caused by a geometric error of the translational axis of the five-axis numerically controlled machine tool is as follows:

$$P_{error} = \begin{bmatrix} \delta_x(X) + \delta_x(Y) + \delta_x(Z) - L(\theta_\beta(X) + \theta_\beta(Y) + \theta_\beta(Z) \\ -Y(\theta_y(X) + \theta_y(Y)) + Z(\theta_\beta(X) + \theta_\beta(Y) + \theta_\beta(Z)) \\ \delta_y(X) + \delta_y(Y) + \delta_y(Z) - L(\theta_\alpha(X) + \theta_\alpha(Y) + \theta_\alpha(Z) \\ + X\theta_y(X) - Z(\theta_\alpha(X) + \theta_\alpha(Y) + \theta_\alpha(Z) \\ \delta_z(X) + \delta_z(Y) + \delta_z(Z) - X\theta_\beta(X) + Y(\theta_\alpha(X) + \theta_\alpha(Y) \end{bmatrix}$$

$$= P_{error}(E(X), E(Y), E(Z))$$

where $E(i) = \delta_x(i), \delta_y(i), \delta_z(i), \theta_\alpha(i), \theta_\beta(i), \theta_y(i)^T$, i=X, Y, Z, denoting the positioning error $\delta_x(i)$, the Y-direction straightness error $\delta_y(i)$, the Z-direction straightness error $\delta_z(i)$, the roll error $\theta_\alpha(i)$, the pitch error $\theta_\beta(i)$, and the deflection error $\theta_y(i)$, and X, Y, and Z denote operating positions of the coordinate axes within a travel range.

In order to better realize the method of the present disclosure, the establishing an error database of the 18 geometric error vectors including the three coordinate axes in the operation 2 includes:

Step 2.1, identifying the geometric errors of the translational axes through a thirteen trajectory line detection manner using a high-precision laser interferometer based on the volumetric positioning error model of the five-axis numerically controlled machine tool established in the operation (1), wherein the identifying the geometric error of the translational axis through a thirteen trajectory line detection manner includes:

determining thirteen linkage trajectory lines in a workspace formed by the motion travel of the translational axis of the machine tool, each linkage trajectory line having a plurality of nodes, running the machine tool to make a spindle move along the thirteen linkage trajectory lines and record an ideal travel and an actual travel at each of the nodes; and modeling the geometric errors of the translational axes and calculating the geometric errors of the translational axes of the machine tool based on the ideal travel and the actual travel at the each of the nodes, wherein each of the linkage trajectory lines includes n+1 nodes, n is a natural number, and the linkage trajectory lines include:

three X-axis trajectory lines L1, L2, and L3 formed by three sides parallel to an X-axis on three surfaces of a co-vertex A of the workspace;

three Y-axis trajectory lines L4, L5, and L6 formed by three sides parallel to a Y-axis on three surfaces of the co-vertex A of the workspace;

three Z-axis trajectory lines L7, L8, and L9 formed by three sides parallel to a Z-axis on three surfaces of the co-vertex A of the workspace;

a linked trajectory line L10 of the X-axis and the Y-axis formed by a diagonal located on the XY plane on the three surfaces of the co-vertex A of the workspace;

a linked trajectory line L11 of the X-axis and the Z axis formed by a diagonal located on the XZ plane on the three surfaces of the co-vertex A of the workspace;

a linked trajectory line L12 of the Y-axis and the Z-axis formed by a diagonal located on the YZ plane on the three surfaces of the co-vertex A of the workspace; and a linked trajectory line L13 of the X-axis, Y-axis, and Z-axis formed by a diagonal passing through the vertex A in the workspace.

In order to better realize the method of the present disclosure, the constructing a volumetric error compensation table of a numerically controlled system in the operation 3 includes:

Step 3.1, dividing the volumetric positioning error into two parts by analyzing a mathematical model between the volumetric positioning error and the geometric error of the tool center point, and taking a projection of the volumetric positioning error Perron in the X-axis direction as an example:

$$P_{error\_X} = L_{error\_X} + N_{error\_X}$$

where $L_{error\_X} = \delta_x(X) + \delta_x(Y) + \delta_x(Z) - L(\theta_\beta(X) + \theta_\beta(Y) + \theta_\beta(Z));$ $$N_{error\_X} = Z(\theta_\beta(X) + \theta_\beta(Y) + \theta_\beta(Z)) - Y(\theta_\gamma(X) + \theta_\gamma(Y));$$

$L_{error\_X}$ denotes a volumetric positioning error linear part, i.e., a linear part composed of geometric errors is related only to the coordinate axes, and the linear part includes a positioning error and a sag error;

$N_{error\_X}$ denotes a volumetric positioning error nonlinear part, i.e., the volumetric positioning error is affected by an interaction between the coordinate axes and the geometric error or between different geometric errors, so that the positioning error changes nonlinearly, and the nonlinear part is the sag error.

Step 3.2, according to a definition of the sag error of the numerically controlled system and a compensation specification of the sag error of the numerically controlled system, expressing the volumetric error compensation as follows:

$$(T_a^b)_i = \begin{cases} \$AN\_CEC\_[i, 0] = x_1, \\ \$AN\_CEC\_[i, 1] = x_2, \\ \ldots, \\ \$AN\_CEC\_[i, N] = x_N, \\ \$AN\_CEC\_INPUT\_AXIS\ [i] = a, \\ \$AN\_CEC\_OUTPUT\_AXIS\ [i] = b, \end{cases}$$

where a denotes a reference coordinate axis (input axis), b denotes a coordinate axis to be compensated (output axis), i denotes an $i^{th}$ compensation table, N denotes N equal parts of the motion position on the reference coordinate axis, $(x_1, x_2, \ldots, x_N)$ denotes N error values of a certain error at the motion position, and $\$AN\_CEC\_$ is a special symbol of a compensation module of the numerically controlled system, wherein if a and b are defined as the same coordinate axes, $(T_a^b)_i$ denotes compensation of a single-axis positioning error; if a and b are defined as different coordinate axes, $(T_a^b)_i$ denotes compensation of the sag error between coordinate axes; and it may be seen from the operation 3.1 that the sag error is divided into a linear part sag error and a nonlinear part sag error, the table $(T_a^b)_i$ is only used for compensation of the linear part sag (positioning) error, the nonlinear part sag error also needs to be combined with a sag error compensation table and a table multiplication function, and an activation symbol in the numerically controlled system is:

$$\$AN\_CEC\_MULT\_BY\_TABLE[i] = j;$$

the symbol indicates that an $i^{th}$ sag error compensation table is multiplied by a $j^{th}$ sag error compensation table;

Step 3.3, constructing the volumetric error compensation table of the numerically controlled system for the compensation of the translational axis positioning error and the sag error, wherein 1) the linear part is rewritten as:

$$S(L_{error\_X}) = (T_x^x)_1 + (T_y^x)_2 - L(T_x^x)_4 - L(T_y^x)_5 - L(T_z^x)_6$$

where $S(L_{error\_X})$ denotes the compensation table of the numerically controlled system; and 2) the nonlinear part is rewritten as:

$$S(N_{error\_X}) = T_z^x((T_x^x)_{71} + (T_y^x)_8 + (T_z^x)_9) + T_y^x((T_x^x)_{10} + (T_y^x)_{11})$$

where $S(N_{error\_X})$ denotes the compensation table of the numerically controlled system.

It is worth noting that although forms of $T_x^x$, $T_y^x$ and $T_z^x$ in the system compensation table are the same, different error values need to be substituted during the compensation due to the difference of errors.

In order to better realize the method of the present disclosure, the establishing the compensation data optimization model of the volumetric positioning error data of the translational axis in the operation 4 includes:

Step 4.2, calculating positioning errors of four diagonals of an XY plane, an XZ plane, a YZ plane, and an XYZ body according to an expression of the volumetric positioning error of the tool center point obtained in the operation (1), wherein since merely the X and Y coordinate axes are involved in the motion when a positioning precision linkage inspection is performed on the diagonal of the XY plane, an XY linkage diagonal positioning error is merely related to the geometric error of the X and Y coordinate axes;

4.2.1) the positioning error of the diagonal of the XY plane is:

$$P_{error\_XY} = \|P_{error}(E(X), E(Y))\|_{E(Z)=0, Z=0}$$

similarly, the positioning errors of the three diagonals of the XZ plane, the YZ plane, and the XYZ body are as follows.

4.2.2) the positioning error of the diagonal of the XZ plane is:

$$P_{error\_XZ} = \|P_{error}(E(X), E(Z))\|_{E(Y)=0, Y=0}$$

4.2.3) the positioning error of the diagonal of the YZ plane is:

$$P_{error\_YZ} = \|P_{error}(E(Y), E(Z))\|_{E(X)=0, X=0}$$

4.2.4) the positioning error of the diagonal of the XYZ body is:

$$P_{error\_XYZ} = \|P_{error}(E(X), E(Z))\|.$$

In order to better realize the method of the present disclosure, quickly optimizing the correction coefficients k and d based on the particle swarm optimization algorithm includes:

Step 5.1, implementing the particle swarm optimization algorithm, and expressing a particle moving position during the optimization by a mathematical equation as:

$$x_i^{k+1} = x_i^k + v_i^{k+1}$$

where k denotes a count of iterations, and k≥0; $x_i$ denotes a position of an $i^{th}$ particle in space; and $v_i$ denotes a particle moving speed in multidimensional space and is expressed as:

$$x_i^{k+1} = x_i^k + v_i^{k+1}$$

where $r_1$ and $r_2$ are random numbers between [0,1]; $c_1$ and $c_2$ denote learning factors, usually, $c_1=c_2=2$; and $w^k$ denotes an inertia weight, $p_i^k$ and $g_i^k$ denote an individual optimal value and a swarm optimal value at a $k^{th}$ iteration, respectively;

Step 5.2, setting an initial count of particle swarms, generating an initial position and an initial velocity vector within a range of correction coefficient, and saving an individual optimal value and a swarm optimal value at each iteration; and Step 5.3, setting a total count of iterations (hereinafter referred to as Iterations) and an iteration precision (hereinafter referred to as tolerance) and executing the operation (5.2) for a new particle movement if the count of iterations does not reach an upper limit or the iteration precision exceeds a given threshold, otherwise, stopping the iteration and outputting a saved particle position where a swarm optimal value is located, at this time the particle optimal position being the values of the coefficient vectors K and D.

In order to better implement the method of the present disclosure, the compensating the volumetric positioning error of the translational axis of the five-axis numerically controlled machine tool in the operation (6) includes:

Step 6.1, generating a sag error compensation file with the correction coefficients according to the operation (3) and the operation (5).

$$(T_a^b)_{ij} = \begin{cases} \$AN\_CEC\_[i, 0] = k_j \cdot e_1 + b_j, \\ \$AN\_CEC\_[i, 1] = k_j \cdot e_2 + b_j, \\ \ldots, \\ \$AN\_CEC\_[i, N] = k_j \cdot e_N + b_j, \\ \$AN\_CEC\_INPUT\_AXIS [i] = a, \\ \$AN\_CEC\_OUTPUT\_AXIS [i] = b, \end{cases}$$

where $(e_1, e_2, \ldots, e_N)$ denotes N error values of any one of the 18 geometric errors on the motion travel, and $k_j$ and $b_j$ denote corresponding correction coefficient values; and Step 6.2, combining the translational axis positioning error and sag error compensation table of the operation (3.3) and the corrected error database $Ebase_{Adjust}$ of the translational axis and completing simultaneous compensation of the linear part and the nonlinear part of the positioning error of the tool center point of the numerically controlled machine tool based on the operation (6.1).

In order to better realize the method of the present disclosure, the guarantee system of periodic detection, optimization, and compensation in the operation (7) includes:

Step 7.1, setting the positioning error threshold and a fixed detection period, performing the linkage trajectory detection on the volumetric positioning error of the translational axis of the numerically controlled machine tool, and continuing to use the translational axis of the numerically controlled machine tool if the volumetric positioning error does not exceed a preset threshold, otherwise executing the operation (7.2); and Step 7.2, taking most recent geometric error compensation data as a new error database, and cycling the operations (2) to (6) to re-compensate with the most recent geometric error compensation data, and forming a volumetric positioning error guarantee system that integrates periodic detection, optimization, and compensation.

For a machine tool of any structural type, according to the obtained volumetric positioning error model of the translational axis, on the basis of identifying the geometric error, the method for optimizing geometric error proposed in the present disclosure may also be used to realize the compensation of the volumetric positioning error of the translational axis.

BRIEF DESCRIPTION OF THE DRAWINGS

The present disclosure will be further illustrated by way of exemplary embodiments, which will be described in detail with the accompanying drawings. These embodiments are not limiting, and in these embodiments the same numbering indicates the same structure, wherein.

DETAILED DESCRIPTION

Figure 1:
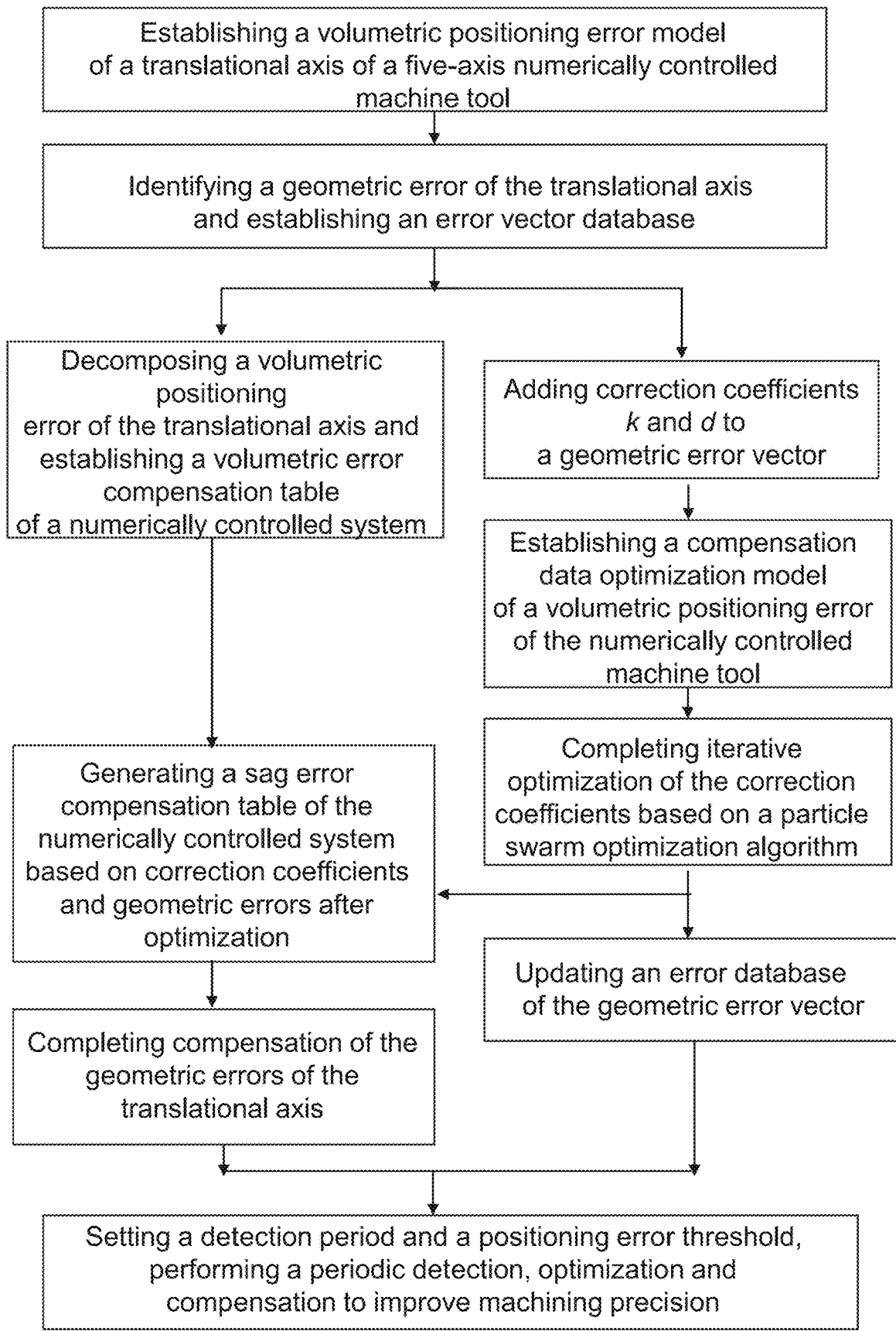
FIG. 1 is a flowchart illustrating an exemplary process of a method for quickly optimizing geometric error compensation data of a translational axis of a five-axis numerically controlled machine tool according to some embodiments of the present disclosure.

Embodiments of the present disclosure are described in detail below, examples of which are shown in the drawings, in which the same or similar reference numerals denote the same or similar elements or elements having the same or similar functions throughout. The embodiments described below by referring to the figures are exemplary, and are intended to only explain the present disclosure and may not be understood as limiting the present disclosure.

In order to make the purpose, process conditions, and advantages of the present disclosure clearer, the present disclosure will be further described in detail in conjunction with the following embodiments, but the implementation of the present disclosure is not limited to this herein. various replacements and changes made according to ordinary technical knowledge and conventional means in the field without departing from the above technical ideas of the present disclosure may be included within the scope of the present disclosure. The specific embodiments described here are only used to explain the present disclosure and are not intended to limit the present disclosure.

A machining precision of a five-axis numerically controlled machine tool is the key to ensuring the quality of workpieces. Among many error sources that affect the machining precision, a geometric error of the machine accounts for more than 50%, which has become an important part that restricts the improvement of machining precision. Research on the geometric error of the five-axis numerically controlled machine tool tools is mainly divided into two aspects: identification and control of a geometric error of a translational axis and identification and control of a geometric error of a rotary axis. Since the translational axis is a most basic motion unit of the numerically controlled machine tool, and especially when a Realtime Transport Control Protocol (RTCP) function is turned on a five-axis machine tool, motion of the rotary axis may also involve the participation of the translational axis, a volumetric positioning precision of the translational axis affects a precision level of the rotary axis. Therefore, it is desirable to provide a method for quickly optimizing geometric error compensation data of a translational axis of a five-axis numerically controlled machine tool, so as to compensate and correct the geometric error of the translational axis of the five-axis numerically controlled machine tool. The method for quickly optimizing geometric error compensation data of a translational axis of a five-axis numerically controlled machine tool is executed by a processor.

In some embodiments, the processor may be used to execute the method for quickly optimizing geometric error compensation data of a translational axis of a five-axis numerically controlled machine tool and process related data. For example, the processor may establish a volumetric positioning error model of a tool center point caused by the geometric error of the translational axis of the five-axis numerically controlled machine tool. For example, the processor may establish an error database of 18 geometric error vectors including three coordinate axes. As another example, the processor may construct a volumetric error compensation table of a numerically controlled system. As yet another example, the processor may numerically solve vectors K and D composed of correction coefficients k and d based on a particle swarm optimization algorithm and complete iterative optimization and selection of the correction coefficients.

In some embodiments, the processor may include a central processing unit (CPU), an application-specific integrated circuit (ASIC), an application-specific instruction-set processor (ASIP), or the like, or any combination thereof. In some embodiments, the processor may be a single server or a group of servers. In some embodiments, the processor may be local or remote.

In some embodiments, the processor may communicate with a device related to the method for quickly optimizing geometric error compensation data of a translational axis of a five-axis numerically controlled machine tool, so as to obtain and process relevant data. A related device may include a numerically controlled machine tool, a sensor (e.g., a temperature sensor, humidity sensor, etc.), a laser interferometer, a user terminal, etc. The relevant data may include at least one of an environmental temperature, error compensation data, positioning error data, workpiece data, or an of device accumulated running time.

FIG. 1 is a flowchart illustrating an exemplary process of a method for quickly optimizing geometric error compensation data of a translational axis of a five-axis numerically controlled machine tool according to some embodiments of the present disclosure. In some embodiments, the method for quickly optimizing geometric error compensation data of a translational axis of a five-axis numerically controlled machine tool may be executed by a processor.

Embodiment 1

As shown in FIG. 1, specific operations of a main process of the embodiment are as follows.

In some embodiments, the processor may establish a volumetric positioning error model of a translational axis of a five-axis numerically controlled machine tool.

In Step 1, establishing a volumetric positioning error model of a tool center point caused by a geometric error of the translational axis of the five-axis numerically controlled machine tool.

Figure 2:
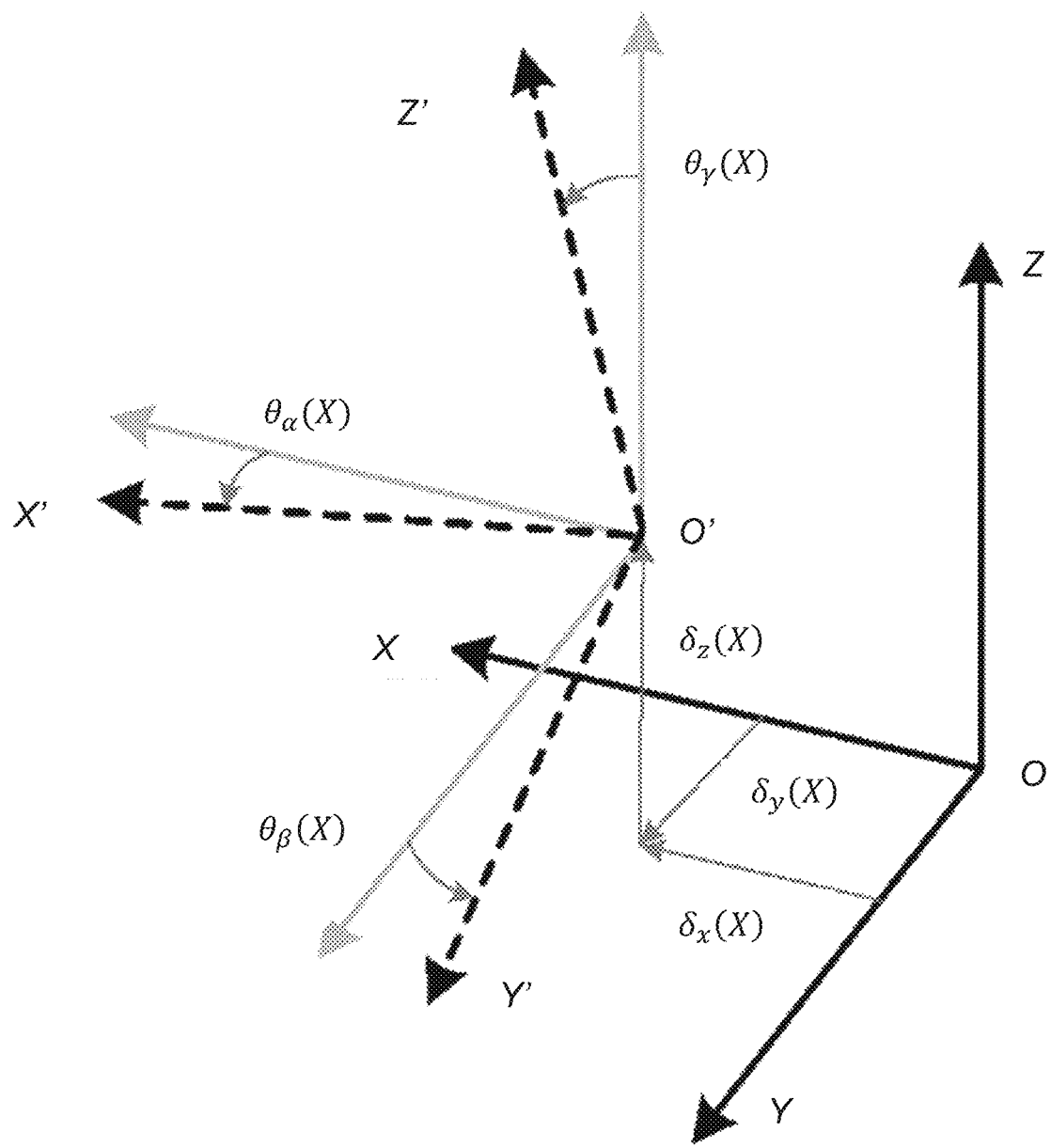
FIG. 2 is a schematic diagram illustrating exemplary geometric errors of a translational axis of a numerically controlled machine tool according to some embodiments of the present disclosure.

Based on a topological structure of the translational axis of the five-axis numerically controlled machine tool and a multi-body system theory, the processor may establish a mathematical relationship between the geometric error and a volumetric positioning error of the translational axis. Take the five-axis numerically controlled machine tool in FIG. 2 as an example:

In step 1.1, describing the geometric error of the translational axis.

Figure 3:
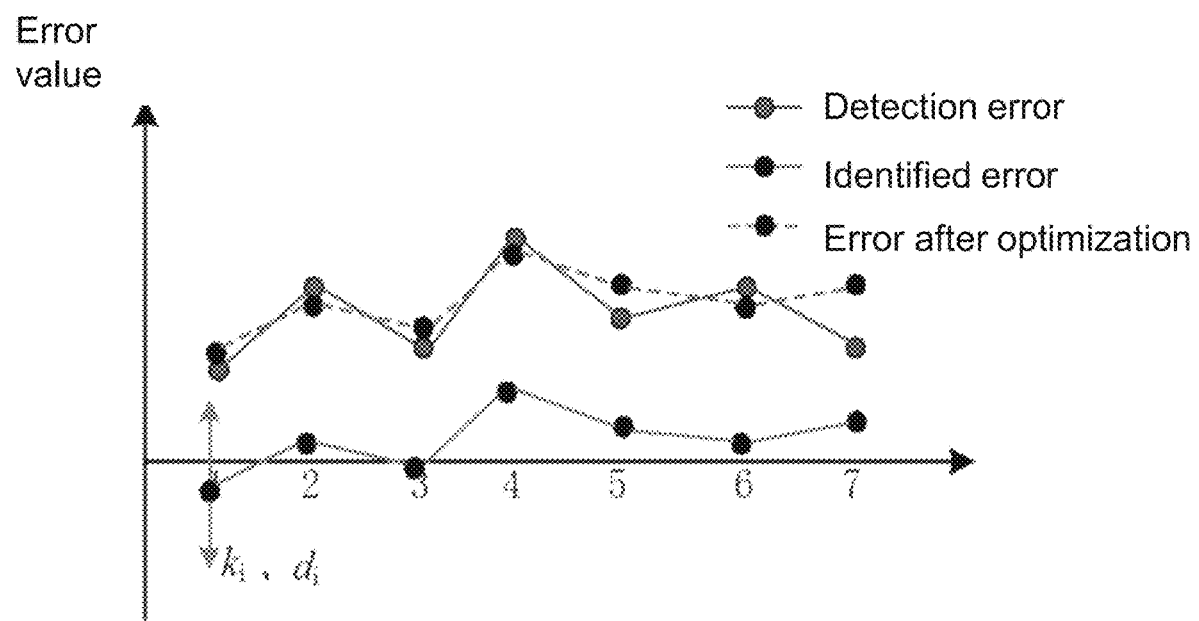
FIG. 3 is a schematic diagram illustrating an exemplary principle of a correction coefficient of a geometric error of a numerically controlled machine tool according to some embodiments of the present disclosure.

Since the volumetric positioning error is affected by the geometric error of the translational axis, the geometric error of the translational axis is described with the help of FIG. 3.

For a feed coordinate axis (i.e., an X axis) in an X direction of the machine tool, there are 3 displacement deviation errors: a positioning error $\delta_x(i)$, a straightness error $\delta_y(i)$, and a straightness error $\delta_z(i)$; and 3 rotation angle errors: a roll error $\theta_\alpha(i)$, a pitch error $\theta_\beta(i)$, and a deflection error $\theta_\gamma(i)$.

The positioning error refers to a deviation value between an actual displacement and a displacement of a relevant movement command. The straightness error refers to a degree to which each point on a straight line jumps or deviates from the straight line. The roll error refers to an angle motion error of rotating around a motion direction of the straight line. The pitch error refers to an error of rotating around a horizontal axis perpendicular to the motion direction. The deflection error refers to an angle motion error of rotating around a plumb axis perpendicular to a main motion direction.

In the same way, 6 geometric errors of a Y-axis and 6 geometric errors of a Z-axis may be obtained, and a generalized form of error vectors of the coordinate axes is further obtained as:

$E(i)=[(\delta_x(i), \delta_y(i), \delta_z(i), \theta_\alpha(i), \theta_\beta(i), \theta_\gamma(i),]^T$, i=X, Y, Z, which denotes a generalized form of the error vectors of the coordinate axes.

where X, Y, and Z are not only used to identify and distinguish coordinate axes but also command operating positions of the coordinate axes, which means that geometric error values constantly change with the motion of the coordinate axes.

In Step 1.2, when moving in their respective directions, the translational axes are affected by the geometric errors, and an actual motion transformation matrix of the translational axes may be expressed by the following equation.

The following equation is expressed as:

$$A_i = T(i) \cdot E_i, \ i = X, Y, Z$$

where $A_i$ denotes the actual motion transformation matrix of a coordinate axis i, and T(i) denotes a theoretical motion transformation matrix of the coordinate axis i. At this time, there are:

$$T(X) = \begin{bmatrix} 1 & 0 & 0 & X \\ 0 & 1 & 0 & 0 \\ 0 & 0 & 1 & 0 \\ 0 & 0 & 0 & 1 \end{bmatrix}.$$

$$T(Y) = \begin{bmatrix} 1 & 0 & 0 & 0 \\ 0 & 1 & 0 & Y \\ 0 & 0 & 1 & 0 \\ 0 & 0 & 0 & 1 \end{bmatrix}.$$

$$T(Z) = \begin{bmatrix} 1 & 0 & 0 & 0 \\ 0 & 1 & 0 & 0 \\ 0 & 0 & 1 & Z \\ 0 & 0 & 0 & 1 \end{bmatrix}.$$

$$E_i = \begin{bmatrix} 1 & -\theta_\gamma(i) & \theta_\beta(i) & \delta_x(i) \\ \theta_\gamma(i) & 1 & -\theta_\alpha(i) & \delta_y(i) \\ -\theta_\beta(i) & \theta_\alpha(i) & 1 & \delta_z(i) \\ 0 & 0 & 0 & 1 \end{bmatrix}, i = X, Y, Z.$$

In Step 1.3, combined with an error matrix and motion matrix of the coordinate axis, and according to the topological structure of the five-axis numerically controlled machine tool and the multi-body system theory, a kinematic relationship of the tool center point with an error is obtained.

The kinematic relationship may be expressed by the following equation:

$$P_{actual} = A_X \cdot A_Y \cdot A_Z \cdot P_t$$

factual denotes actual coordinates of the tool center point in a workpiece coordinate system, $P_t = [0\ 0\ -L\ 1]^T$. $P_t$ denotes coordinates of the tool center point in a tool coordinate system, and L denotes a tool length.

In Step 1.4, if an error source is ignored, the actual motion transformation matrix in the operation 1.2 and the operation 1.3 is a theoretical motion transformation matrix, and a kinematic relationship of the tool center point under an ideal condition may be obtained.

The kinematic relationship of the tool center point may be expressed by the following equation:

$$P_{ideal} = T(X) \cdot T(Y) \cdot T(Z) \cdot P_t$$

$P_{ideal}$ denotes theoretical coordinates of the tool center point in the workpiece coordinate system.

In Step 1.5, combined with the operation 1.3 and operation 1.4, a volumetric positioning error mathematical model of the translational axis of the numerically controlled machine tool is obtained.

The volumetric positioning error mathematical model of the translational axis of the numerically controlled machine tool may be expressed as:

$$P_{error} = P_{actual} - P_{ideal}$$

The five-axis numerically controlled machine tool in the operation (1) may be a CA double pendulum head vertical five-axis numerically controlled machine tool, etc. According to the operations 1.2 to 1.4, the processor may obtain the volumetric positioning error model of the tool center point established by the five-axis numerically controlled machine tool, and the volumetric positioning error of the tool center point of the five-axis numerically controlled machine tool may be expressed as:

$$P_{error} = \begin{bmatrix} \delta_x(X) + \delta_x(Y) + \delta_x(Z) - L(\theta_\beta(X) + \theta_\beta(Y) + \theta_\beta(Z)) - \\ Y(\theta_\gamma(X) + \theta_\gamma(Y)) + Z(\theta_\beta(X) + \theta_\beta(Y) + \theta_\beta(Z)) \\ \delta_y(X) + \delta_y(Y) + \delta_y(Z) - L(\theta_\alpha(X) + \theta_\alpha(Y) + \theta_\alpha(Z)) + \\ X\theta_\gamma(X) - Z(\theta_\alpha(X) + \theta_\alpha(Y) + \theta_\alpha(Z)) \\ \delta_z(X) + \delta_z(Y) + \delta_z(Z) - X\theta_\beta(X) + Y(\theta_\alpha(X) + \theta_\alpha(Y)) \end{bmatrix}$$

$$= P_{error}(E(X), E(Y), E(Z))$$

where L denotes the tool length, and X, Y, and Z denote command operating positions of the coordinate axes of the machine tool, respectively.

In some embodiments, the processor may identify the geometric error of the translational axis and establish an error vector database.

In Step 2, establishing an error database of the 18 geometric error vectors including the three coordinate axes.

The processor completes linkage trajectory detection of the translational axis of the machine tool based on a laser interferometer. Within a motion travel, the processor may identify the 18 geometric errors of the translational axis and form the error database including the 18 geometric error vectors.

In Step 2.1, obtaining geometric error identification values of the translational axis by identifying the geometric errors of the translational axes through a thirteen trajectory line detection manner using the high-precision laser interferometer based on the volumetric positioning error model of the five-axis numerically controlled machine tool established in the operation (1).

The high-precision laser interferometer refers to a high-precision instrument that can measure physical quantities such as length and angle using a laser light source and interference phenomenon.

In some embodiments, the processor may identify the geometric errors of the translational axes through the thirteen-trajectory line detection manner. The specific identification process is as follows. Thirteen linkage trajectory lines may be determined in a workspace formed by the motion travel of the translational axis of the machine tool, each linkage trajectory line has a plurality of nodes, the machine tool is run to make a spindle moves along the thirteen linkage trajectory lines, and an ideal travel and an actual travel at each of the nodes are recorded.

The processor may model the geometric errors of the translational axes and calculate the geometric errors of the translational axes of the machine tool based on the ideal travel and the actual travel at the each of the nodes. Each of the linkage trajectory lines includes n+1 nodes, n is a natural number, and the linkage trajectory lines includes:

three X-axis trajectory lines L1, L2, and L3 formed by three edges parallel to the X-axis on three surfaces of a co-vertex A of the workspace;

three Y-axis trajectory lines L4, L5, and L6 formed by three edges parallel to the Y-axis on three surfaces of the co-vertex A of the workspace;

three Z-axis trajectory lines L7, L8, and L9 formed by three edges parallel to the Z-axis on three surfaces of the co-vertex A of the workspace;

a linked trajectory line L10 of the X-axis and the Y-axis axis formed by a diagonal located on an XY plane on the three surfaces of the co-vertex A of the workspace;

a linked trajectory line L11 of the X-axis and the Z-axis formed by a diagonal located on an XZ plane on the three surfaces of the co-vertex A of the workspace;

a linked trajectory line L12 of the Y-axis and the Z-axis formed by a diagonal located on a YZ plane on the three surfaces of the co-vertex A of the workspace;

a linked trajectory line L13 of the X-axis, Y-axis, and Z-axis formed by a diagonal passing through the vertex A of the workspace.

In Step 2.2, combining six geometric errors identified for each axis into a form of a total error vector.

The total error vector may be expressed by the following equation:

$$E_{1\times 18} = [\underbrace{\delta_x(X), \ldots, \theta_y(X)}_{\text{six items}}, \underbrace{\delta_x(Y), \ldots, \theta_y(Y)}_{\text{six items}}, \underbrace{\delta_x(Z), \ldots, \theta_y(Z)}_{\text{six items}}]$$

In Step 2.3, extending each error into a position-dependent vector throughout a whole motion travel since the 18 geometric errors of the translational axis are interrelated with a motion position and dividing the motion position into N equal parts, wherein same geometric errors at different positions are all slightly different, and the error database of the translational axis of the numerically controlled machine tool is expressed as follows:

The following expression is:

$$Ebase_{N\times 18} = \begin{bmatrix} \delta_x(X)_1, \ldots, \theta_y(X)_1, \delta_x(Y)_1, \ldots, \theta_y(Y)_1, \delta_x(Z)_1, \ldots, \theta_y(Z)_1 \\ \ldots \\ \delta_x(X)_N, \ldots, \theta_y(X)_N, \delta_x(Y)_N, \ldots, \theta_y(Y)_N, \delta_x(Z)_N, \ldots, \theta_y(Z)_N \end{bmatrix}$$

At this time, Ebase is the geometric error database of the translational axis of the numerically controlled machine tool.

In order to realize a high-precision machining of the numerically controlled machine tool, the processor may compensate the obtained geometric errors of the translational axes, so as to reduce the influence of the geometric errors on the volumetric positioning error of the tool.

In some embodiments, the processor may decompose the volumetric positioning error of the translational axis and establish a volumetric error compensation table of the numerically controlled system.

In Step 3, constructing the volumetric error compensation table of the numerically controlled system.

The processor may decompose the volumetric positioning error of the translational axis into a positioning error and a sag error, and construct the volumetric error compensation table of the numerically controlled system based on a straightness error compensation function of the numerically controlled system to compensate the positioning error and sag error.

The sag error refers to a deviation value of a measured element (e.g., a line, or surface) on a part that deviates from a reference element by 90°. When the two elements are ideally perpendicular, the sag error is 0.

In Step 3.1, dividing the volumetric positioning error into two parts by analyzing a mathematical model between the volumetric positioning error and the geometric error of the tool center point, the two parts including a volumetric positioning error linear part and a volumetric positioning error nonlinear part, wherein By analyzing the mathematical expression of the volumetric positioning error of the tool center point obtained in the operation 1.5, the processor may divide the volumetric positioning error into two parts and take a projection of the volumetric positioning error $P_{error}$ in the X-axis direction as an example:

$$P_{error\_X}=L_{error\_X}+N_{error\_X}$$

where $L_{error\_X}=\delta_x(X)+\delta_x(Y)+\delta_x(Z)-L(\theta_\beta(X)+\theta_\beta(Y)+\theta_\beta(Z))$;

$$N_{error\_X}=Z(\theta_\beta(X)+\theta_\beta(Y)+\theta_\beta(Z))-Y(\theta_\gamma(X)+\theta_\gamma(Y));$$

$L_{error\_X}$ denotes the volumetric positioning error linear part, i.e., a linear part composed of geometric errors is related only to the coordinate axes, and the linear part includes a positioning error and the sag error.

$N_{error\_X}$ denotes the volumetric positioning error nonlinear part, i.e., a geometric error between coordinate axes or a geometric error of coordinate axes with respect to each other act together on the volumetric positioning error to make the positioning error change nonlinearly, and the nonlinear part is the sag error.

In Step 3.2, the volumetric error compensation is expressed according to a definition of the sag error of the numerically controlled system and a compensation specification of the sag error of the numerically controlled system.

The basic may be expressed as follows:

$$(T_a^b)_i = \begin{cases} \$AN\_CEC\_[i, 0] = x_1, \\ \$AN\_CEC\_[i, 1] = x_2, \\ \ldots \ldots, \\ \$AN\_CEC\_[i, N] = x_N, \\ \$AN\_CEC\_INPUT\_AXIS[i] = a, \\ \$AN\_CEC\_OUTPUT\_AXIS[i] = b \end{cases}$$

where a denotes a reference coordinate axis, i.e., an input axis, b denotes a coordinate axis to be compensated, i.e., an output axis, i denotes an $i^{th}$ compensation table, N denotes N equal parts of the motion position on the reference coordinate axis, $(x_1, x_2, \ldots, x_N)$ denotes N error values of a certain error on the motion position, and $AN\_CEC\_$ is a special symbol of a compensation module of the numerically controlled system.

If a and b are defined as the same coordinate axes, $(T_a^b)_i$ indicates compensation of a single-axis positioning error; if a and b are defined as different coordinate axes, $(T_a^b)_i$ denotes compensation of the sag error between the coordinate axes that are perpendicular to each other.

It may be seen from the operation 3.1 that the sag error is divided into a linear part sag error and a nonlinear part sag error. $(T_a^b)_i$ is only used for compensation of the linear part sag (positioning) error, the nonlinear part sag error needs to be combined with a sag error compensation table and a table multiplication function, and an activation symbol in the numerically controlled system is:

$$\$AN\_CEC\_MULT\_BY\_TABLE[i]=j.$$

The symbol indicates that an $i^{th}$ sag error compensation table is multiplied by a $j^{th}$ sag error compensation table.

In Step 3.3, constructing the volumetric error compensation table of the numerically controlled system for the compensation of the translational axis positioning error and the sag error.

1) The linear part may be rewritten as:

$$S(L_{error\_x}) = (T_x^x)_1 + (T_y^x)_2 + (T_z^x)_3 + (T_x^x)_4 + (T_y^x)_5 + (T_z^x)_6$$

where $S(L_{error\_x})$ denotes the compensation table of the numerically controlled system.

2) The nonlinear part may be rewritten as:

$$S(N_{error\_x}) = T_z^x((T_x^x)_7 + (T_y^x)_8 + (T_z^x)_9 + T_y^x((T_x^x)_{10} + (T_x^x)_{11})$$

where $S(N_{error\_x})$ denotes the compensation table of the numerically controlled system.

It is worth noting that although forms of $T_x^x$, $T_y^x$ and $T_z^x$ in the system compensation table are the same, different error values need to be substituted during the compensation due to the difference of errors.

Although a relatively good identification manner is adopted in the operation 2, a certain device random error may be introduced in an actual identification process, resulting in a large deviation between an identified error compensation value and an actually required error compensation value, and considering factors such as lead screw rod wear, the geometric errors of the translational axes may gradually deviate from an original identification result and repeated detection and identification may undoubtedly increase more costs and reduce production efficiency. In this regard, in order to meet the requirements of good machining precision retention of the numerically controlled machine tool and improve detection efficiency, the present disclosure only selects 4 of the trajectory lines, that is, a detection mode featuring three face diagonals with two-axis linkage and one body diagonal with three-axis linkage between translational axes, thereby further reducing the complexity of operation.

In some embodiments of the present disclosure, the detection efficiency is higher by simplifying a detection trajectory of the machine tool. Except that a first detection requires a detection of 13 trajectory lines, in the subsequent periodic detection, only 4 trajectory lines are required to complete the detection and compensation of the volumetric positioning errors each time, which can greatly improve the operability of machine tool detection.

In some embodiments, the processor may establish a compensation data optimization model of the volumetric positioning error of the numerically controlled machine tool.

In Step 4, establishing a compensation data optimization model of the volumetric positioning error of the translational axis of the numerically controlled machine tool, adding correction coefficients k and d to the geometric error vectors obtained in the operation (2), and combining with a translational axis linkage trajectory positioning error model to form an optimization model of three face diagonals and one body diagonal in a translational axis linkage mode.

In some embodiments, the processor may add the correction coefficients k and d to the geometric error vectors.

In Step 4.1, adding the correction coefficients k and d to each error of the geometric error vectors obtained in the operation 2.

A basic form is as follows:

$$e\_Adjust = ke + d$$

where e denotes any one of the geometric error vectors, and $e_{Adjust}$ denotes a corrected error. An expression for correcting an entire geometric error vector is:

$$Ebase\_Adjust_{N \times 18} = \begin{bmatrix} \underbrace{\delta_x(X)_1, \ldots, \theta_y(X)_1, \delta_x(Y)_1, \ldots}_{k_1,d_1}, \underbrace{\theta_y(Y)_1}_{k_i,d_i}, \delta_x(Z)_1, \ldots \theta_y(Z)_1 \\ \vdots \\ \underbrace{\delta_x(X)_N, \ldots, \theta_y(X)_N, \delta_x(Y)_N, \ldots}_{k_1,d_1}, \underbrace{\theta_y(Y)_N}_{k_i,d_i}, \delta_x(Z)_N, \ldots, \theta_y(Z)_N \end{bmatrix}$$

where $Ebase_{adjust}$ is a corrected geometric error database of the translational axis, $k_i$ and $d_i$ denote correction coefficients required for an $i^{th}$ error, a purpose of adding the correction coefficients is to realize a dynamic change of each error vector within a certain range so as to achieve a state that is closer to a real error.

Figure 4:
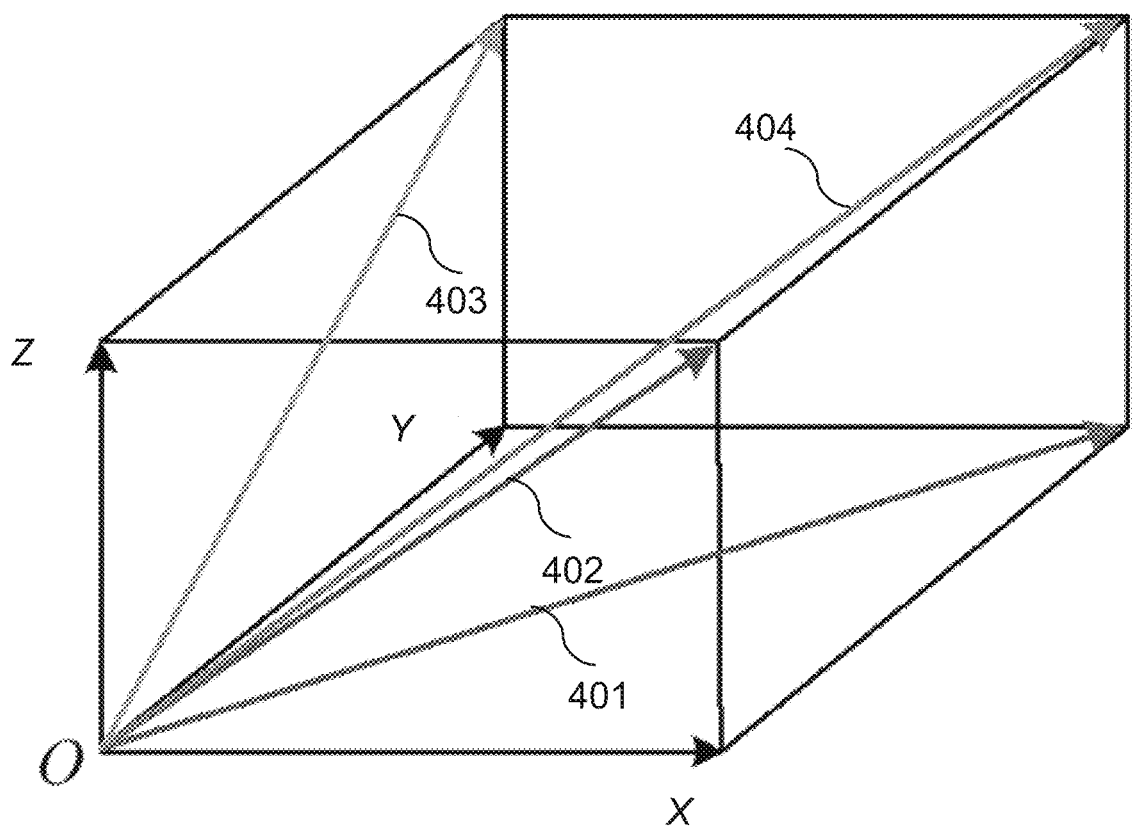
FIG. 4 is a schematic diagram illustrating an exemplary positioning error linkage trajectory detection of a numerically controlled machine tool according to some embodiments of the present disclosure.
Figure 5:
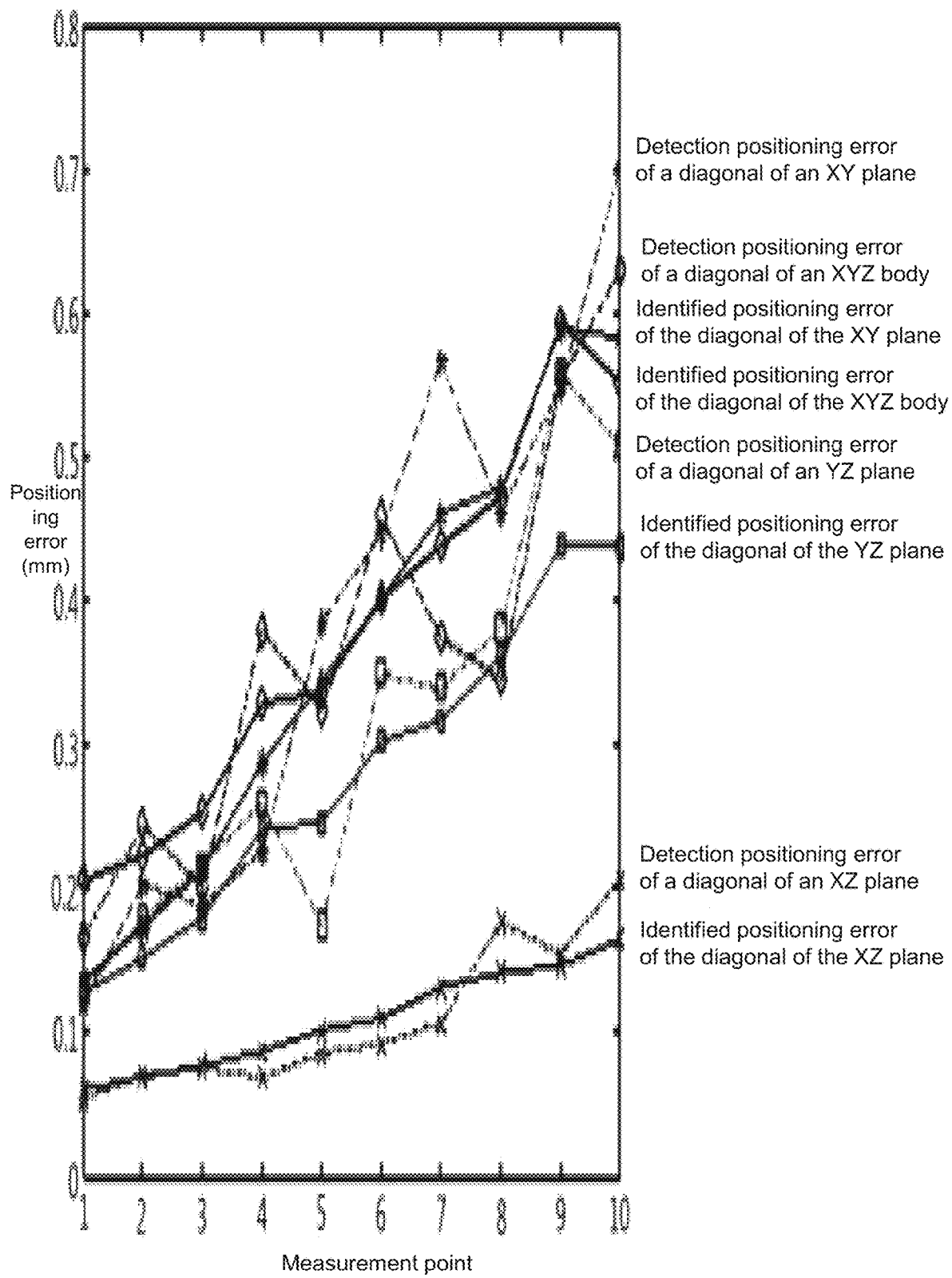
FIG. 5 is a comparison diagram illustrating a linkage trajectory positioning error and a detection positioning error before quickly optimizing according to some embodiments of the present disclosure.

With the help of FIG. 4, the meaning and principle of correcting the geometric errors may be further illustrated. The processor may search for upper and lower bounds of the geometric errors (identified errors) by relying on the correction coefficients $k_i$ and $d_i$. $k_i$ mainly completes a scaling adjustment of data, and $d_i$ completes overall offset adjustment of the data. The adjustment process can complete approximation of a real detection error, and the adjustment is performed simultaneously on all the geometric errors to achieve accurate error compensation.

However, in an actual optimization design, the processor may not obtain real errors of the geometric errors at different coordinate positions, and the optimization design may only be performed through linkage trajectory positioning errors that indirectly reflect the real errors, so the linkage trajectory positioning errors of the translational axis is determined as evaluation indexes in the present disclosure.

In Step 4.2, calculating positioning errors of four diagonals of the XY plane, the XZ plane, the YZ plane, and the XYZ body in FIG. 4 according to the expression of volumetric positioning error of the tool center point obtained in the operation 1.

The line marked as 401 in FIG. 4 is a diagonal of the XY plane.

The line marked as 402 in FIG. 4 is a diagonal of the XZ plane.

The line marked as 403 in FIG. 4 is a diagonal of the YZ plane.

The line marked as 404 in FIG. 4 is a diagonal of the XYZ body.

The expression of positioning error refers to an expression of a coordinate-based positioning error.

Since merely the X and Y coordinate axes are involved in the motion when a positioning precision linkage inspection is performed on the diagonal of the XY plane, an XY linkage diagonal positioning error is merely related to the geometric error of the X and Y coordinate axes.

In Step (4.2.1), the positioning error of the diagonal of the XY plane is:

$$P_{error\_XY} = \|P_{error}(E(X), E(Y))\|_{E(Z)=0, Z=0}$$

Similarly, the processor may obtain expressions of positioning errors of the three diagonals of the XZ plane, the YZ plane, and the XYZ body.

In Step (4.2.2), the positioning error of the diagonal of the XZ plane is:

$$P_{error\_XZ}=\|P_{error}(E(X),E(Z))\|_{E(Y)=0,Y=0}$$

In Step (4.2.3), the positioning error of the diagonal of the YZ plane is:

$$P_{error\_YZ}=\|P_{error}(E(Y),E(Z))\|_{E(X)=0,X=0}$$

In Step (4.2.4), the positioning error of the diagonal of the XYZ body is:

$$P_{error\_XYZ}=\|P_{error}(E(X),E(Y),E(Z))\|$$

In Step 4.3, obtaining corrected positioning errors (i.e., $P_{error\_XY\_Ad}$, $P_{error\_YZ\_Ad}$, $P_{error\_XZ\_Ad}$, and $P_{error\_XYZ\_Ad}$) of the four diagonals by substituting the geometric error $Ebase_{Adjust}$ after the correction coefficients are added into the positioning errors of the four diagonals calculated in the operation 4.2.

In Step 4.4, obtaining machine tool linkage trajectory detection positioning error data by directly detecting the positioning errors of three face diagonals and one body diagonal during linkage of the translational axis using the laser interferometer.

In some embodiments, the positioning error data may be determined through a laser measurement compensation model. More descriptions regarding the laser measurement compensation model may be found in FIG. 7 and the related descriptions thereof.

The detection positioning error of the diagonal of the XY plane is: $\hat{P}_{error\_XY}$.

The detection positioning error of the diagonal of the XZ plane is: $\hat{P}_{error\_XZ}$.

The detection positioning error of the diagonal of the YZ plane is: $\hat{P}_{error\_YZ}$.

The detection positioning error of the diagonal of the XYZ body is: $\hat{P}_{error\_XYZ}$.

In Step 4.5, comparing linkage trajectory positioning errors detected by the instrument with positioning errors calculated by the error model.

Figure 6:
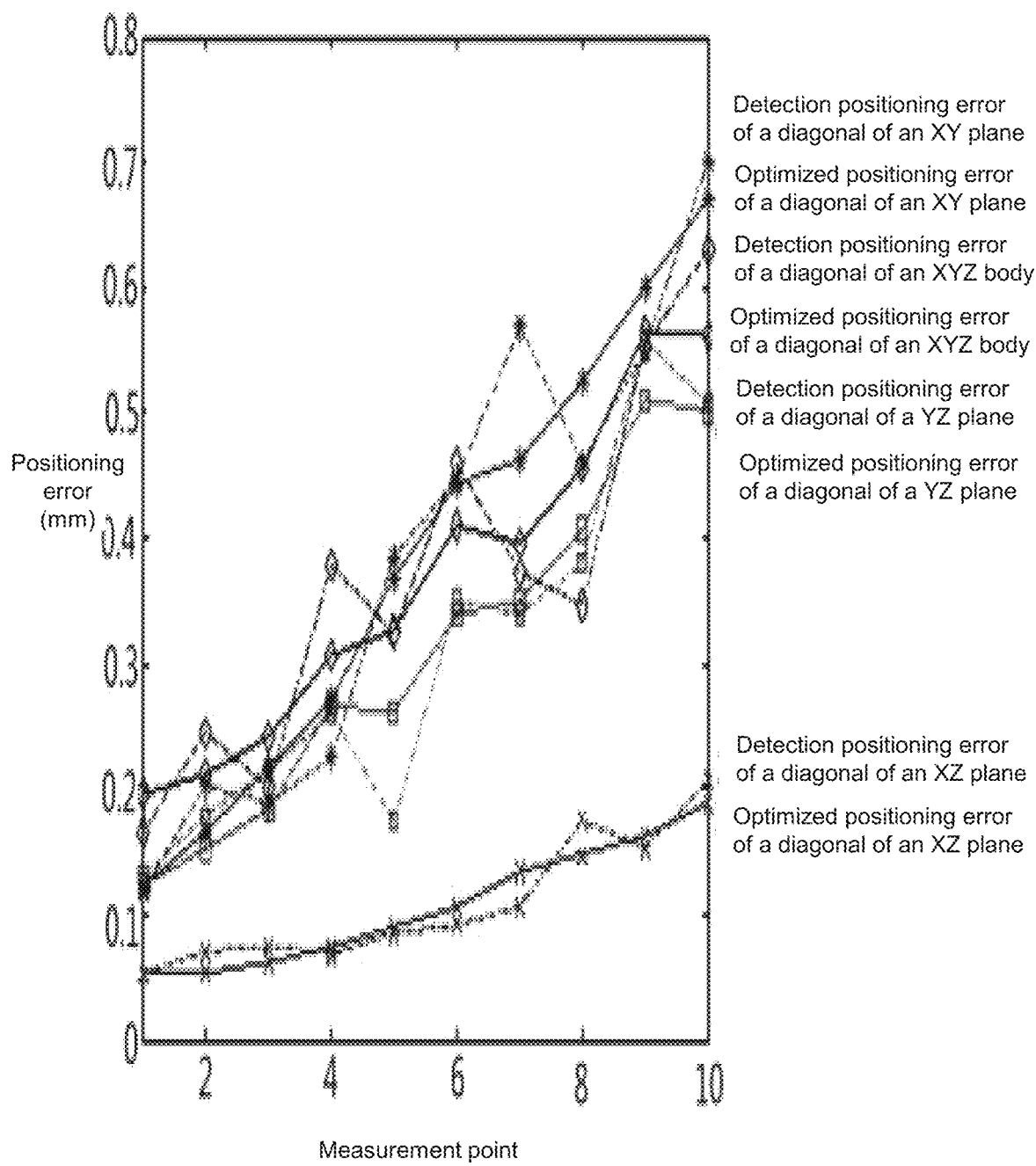
FIG. 6 is a comparison diagram illustrating a linkage trajectory positioning error and a detection positioning error after quickly optimizing according to some embodiments of the present disclosure.

As shown in FIG. 6, the processor may calculate differences between the detection positioning errors and the positioning errors calculated by the model in FIG. 6, and obtain four optimization objectives by taking a smallest sum of squared differences as an optimization objective.

$$\begin{cases} F_{xy} = \left(P_{error\_XY\_Ad} - \hat{P}_{error\_XY}\right)^2 \\ F_{xz} = \left(P_{error\_XZ\_Ad} - \hat{P}_{error\_XZ}\right)^2 \\ F_{yz} = \left(P_{error\_YZ\_Ad} - \hat{P}_{error\_YZ}\right)^2 \\ F_{xyz} = \left(P_{error\_XYZ\_Ad} - \hat{P}_{error\_XYZ}\right)^2 \end{cases}$$

where $F_{xy}$, $F_{xz}$, $F_{yz}$, and $F_{xyz}$ denote optimization objectives corresponding to geometric error compensation data when XY, XZ, YZ, and XYZ are linked, and all indicate that the corrected diagonal positioning errors need to be as close as possible to real positioning errors, so as to optimize the geometric error compensation data.

Since data in FIG. 6 are all discrete data points, an accurate analytical solution may not be obtained during data processing, and only an approximate numerical solution may be obtained by optimizing within a value range through an intelligent algorithm. In this regard, the present disclosure introduces a particle swarm optimization algorithm to quickly optimize the correction coefficients k and d.

In some embodiments, the processor may complete iterative optimization of the correction coefficients based on a multi-objective particle swarm optimization algorithm.

In Step 5, numerically solving vectors K and D composed of the correction coefficients k and d based on the particle swarm optimization algorithm to complete the iterative optimization of the compensation data to realize the optimization and selection the correction coefficients.

The numerically solving refers to solving a numerical solution using a numerical calculation manner, which may obtained approximate results with a certain degree of accuracy for some problems. For example, the numerically solving may include numerical manners such as a conjugate gradient manner and a Newton manner.

The particle swarm optimization algorithm is an evolutionary computing technology based on a swarm, which moves individuals in the swarm to good regions according to the adaptability to an environment.

Specific implementation operations are as follows.

In Step 5.1, implementing the particle swarm optimization algorithm.

A particle moving position during the optimization is expressed by a mathematical equation as:

$$x_i^{k+1}=x_i^k+v_i^{k+1}$$

where k denotes a count of iterations, and k≥0; $x_i$ denotes a position of an $i^{th}$ particle in space; and $v_i$ denotes a particle moving speed in multidimensional space and is expressed as:

$$v_i^{k+1}=w^k v_i^k+c_1 r_1(p_i^k-x_i^k)+c_2 r_2(g_i^k-x_i^k)$$

where $r_1$ and $r_2$ are random numbers between [0, 1]; $c_1$ and $c_2$ denote learning factors, usually, $c_1=c_2=2$; and $w^k$ denotes an inertia weight, $p_i^k$ and $g_i^k$ denote an individual optimal value and a swarm optimal value at a $k^{th}$ iteration, respectively;

In Step 5.2, setting an initial count of particle swarms, generating an initial position and an initial velocity vector within a range of correction coefficient, and saving an individual optimal value and a swarm optimal value at each iteration.

The specific process includes the following operations.

1) In step 4.1, adding the correction coefficients k and d to each error, and forming the correction coefficients into coefficient vectors K and D. The specific expression is as follows.

$$\begin{cases} K = [k_1, k_2, \ldots, k_{18}] \\ D = [d_1, d_2, \ldots, d_{18}] \end{cases}$$

where $k_1, k_2, \ldots, k_{18}$ and $d_1, d_2, \ldots, d_{18}$ are correction coefficients corresponding to the 18 geometric errors (arranged according to the operation 2.2). At this time, a position of a single particle is a vector composed of [K, D], and a count of vector columns is 36.

2) If a given count of particle swarms is M, a value range of k is (0.5, 1.5), a value range of d is (−0.02, 0.02), initial correction coefficients vector may be assumed as K=[1, 1, . . . , 1] and D=[0, 0, . . . , 0]. All elements in the initial correction coefficient vectors may be multiplied by random numbers (rand) in a range of 0 to 1, which is repeated for M times to obtain a set of correction coefficient vectors $\tilde{K}_{M\times 18}=[K_1, K_2, \ldots, K_M]^T$ and $\tilde{D}_{M\times 18}=[D_1, D_2, \ldots, D_M]^T$. At this time, the position of one single particle may be expanded into a set of initial particle positions of M×36.

3) An initial particle speed adopts a random number (rand) in the range of 0 to 1, which is also repeated for M times to obtain a set of initial particle speeds.

4) For the optimization objectives of the four diagonals in the operation 4.5, a single optimization objective function may be obtained using a multi-objective linear weighting manner:

$$F=\lambda_1 F_{xy}+\lambda_2 F_{xz}+\lambda_3 F_{yz}+\lambda_4 F_{xyz}$$

where $\lambda_i$ denotes weight coefficients, and i=1, 2, 3, 4. A sum of the weight coefficients is 1. The slightly larger the weight coefficient of the body diagonal is, the better the optimization effect is.

5) Initial objective function values may be calculated by substituting the set of initial particle positions into Ebase_Adjust, M objective function values are recorded as initial individual optimal values, initial population optimal values are selected from the initial individual optimal values, and finally particle positions of a next iteration are calculated combined with the initial velocity vector.

In Step 5.3, setting a total count of iterations (hereinafter referred to as Iterations) and an iteration precision (hereinafter referred to as tolerance) and executing the operation (5.2) for a new particle movement if the count of iterations does not reach an upper limit or the iteration precision exceeds a given threshold, otherwise, stopping the iteration and outputting a saved particle position where a swarm optimal value is located. At this time, the particle optimal position is the values of the coefficient vectors K and D.

In some embodiments, the processor may generate a sag error compensation table of the numerically controlled system based on the optimized correction coefficients and the optimized geometric error.

In Step 6, generating the volumetric error compensation table of the numerically controlled system by combining the correction coefficient vector obtained in the operation (5) and the geometric error vector with the operation (3) and completing compensation of the geometric errors of the five-axis numerically controlled machine tool.

Through an intelligent optimization process of the particle swarm algorithm, the processor may obtain the correction coefficient vectors K and D that meet the optimization objectives of the positioning errors of the four diagonals, and combine the identified 18 geometric errors to obtain a comparison chart between the optimized positioning error and the detection positioning error as shown in FIG. 6.

The processor may make a difference Δe between the identification positioning error and the detection positioning error before and after optimization at each operating position of the linkage trajectory, and a comparison result is as follows.

error of the translational axis of the five-axis numerically controlled machine tool. The specific process includes the following operations.

In Step 6.1, generating a sag error compensation file with the correction coefficients according to the operation (3) and the operation (5).

The sag error compensation file with the correction coefficients is as follows:

$$(T_a^b)_{ij} = \begin{cases} \$AN\_CEC\_[i, 0] = k_j \cdot e_1 + b_j, \\ \$AN\_CEC\_[i, 1] = k_j \cdot e_2 + b_j, \\ \quad \ldots \ldots, \\ \$AN\_CEC\_[i, N] = k_j \cdot e_N + b_j, \\ \$AN\_CEC\_INPUT\_AXIS[i] = a, \\ \$AN\_CEC\_OUTPUT\_AXIS[i] = b \end{cases}$$

where $(e_1, e_2, \ldots, e_N)$ denotes N error values of any one of the 18 geometric errors on the motion travel, and $k_j$ and $b_j$ denote corresponding correction coefficient values.

In some embodiments, the processor may complete compensation of the geometric errors of the translational axes.

In Step 6.2, combining the translational axis positioning error and sag error compensation table of the operation (3.3) and the corrected error database Ebase$_{Adjust}$ of the translational axis and completing simultaneous compensation of the linear part and the nonlinear part of the positioning error of the tool center point of the numerically controlled machine tool based on the operation (6.1).

In Step 7, iterating error correction data to the error database in the operation (2), performing linkage trajectory detection on the volumetric positioning error of the translational axis by setting a fixed period, presetting a positioning error threshold, and cycling the operations (2) to (6) to realize a machine tool precision guarantee system for periodic detection, optimization, and compensation.

In some embodiments, the periodic detection may include a fixed detection cycle and a non-fixed detection cycle. The fixed detection cycle may be a fixed period or a constant period. The non-fixed detection cycle may be a changeable period. More descriptions regarding the non-fixed detection cycle may be found in FIG. 8 and the related descriptions thereof.

For the five-axis numerically controlled machine tool, after the compensation of the volumetric positioning error

|  | XY | | XZ | | YZ | | XYZ | |
| --- | --- | --- | --- | --- | --- | --- | --- | --- |
|  | maximum | standard deviation | maximum | standard deviation | maximum | standard deviation | maximum | standard deviation |
| Before optimization | 0.118 | 0.061 | 0.041 | 0.023 | 0.119 | 0.049 | 0.126 | 0.064 |
| After optimization | 0.105 | 0.051 | 0.028 | 0.017 | 0.087 | 0.037 | 0.109 | 0.056 |

According to the comparison result in the table, for a difference between the positioning errors, both the maximum value or the standard deviation is reduced after the optimization, which shows that the optimization effect is obvious.

The processor may substitute the optimized data into the sag error compensation of the numerically controlled system to realize the compensation of the volumetric positioning through the operations 1 to 6 is completed, a relatively high positioning precision may be maintained for a considerable period of time, but with a continuous increase of a use time of the machine tool, the positioning precision of the machine tool may decline. Therefore, it is very necessary to carry out regular detection of precision.

In Step 7.1, setting a preset positioning error threshold, for example, one month as a fixed detection cycle, performing the linkage trajectory detection on the volumetric positioning error of the translational axis of the numerically controlled machine tool, and continuing to use the translational axis of the numerically controlled machine tool if the volumetric positioning error does not exceed a preset threshold, otherwise, executing the operation (7.2).

The preset positioning error threshold refers to a preset error threshold for positioning. In some embodiments, the preset positioning error threshold may be set by a technician based on experience.

In some embodiments, the processor may update a geometric error vector database. The processor may set the detection cycle and positioning error threshold, a periodic detection, optimization, and compensation to improve machining precision.

In Step 7.2, taking most recent geometric error compensation data as a new error database, and cycling the operations (2) to (6) to re-compensate with the most recent geometric error compensation data, and forming a volumetric positioning error guarantee system that integrates periodic detection, optimization, and compensation.

In some embodiments of the present disclosure, the quality of volumetric positioning error compensation is improved. Compared with a traditional manner of direct compensation, the geometric error is compensated after optimization, which can avoid a sudden increase or decrease caused by wrong compensation of a wrong error compensation value and is very beneficial to the executability of subsequent periodic detection and compensation. In some embodiments of the present disclosure, the robustness of an optimization compensation is high, and it is proposed that the geometric error is compensated after optimization, which has a low requirement for an initial identification error precision. This is because even if an identification error precision is low due to various factors, it can be compensated and corrected through an optimization manner proposed in the present disclosure, thereby reducing the requirement for the geometric error identification precision in an early stage and improving the adaptability of the present disclosure.

Figure 7:
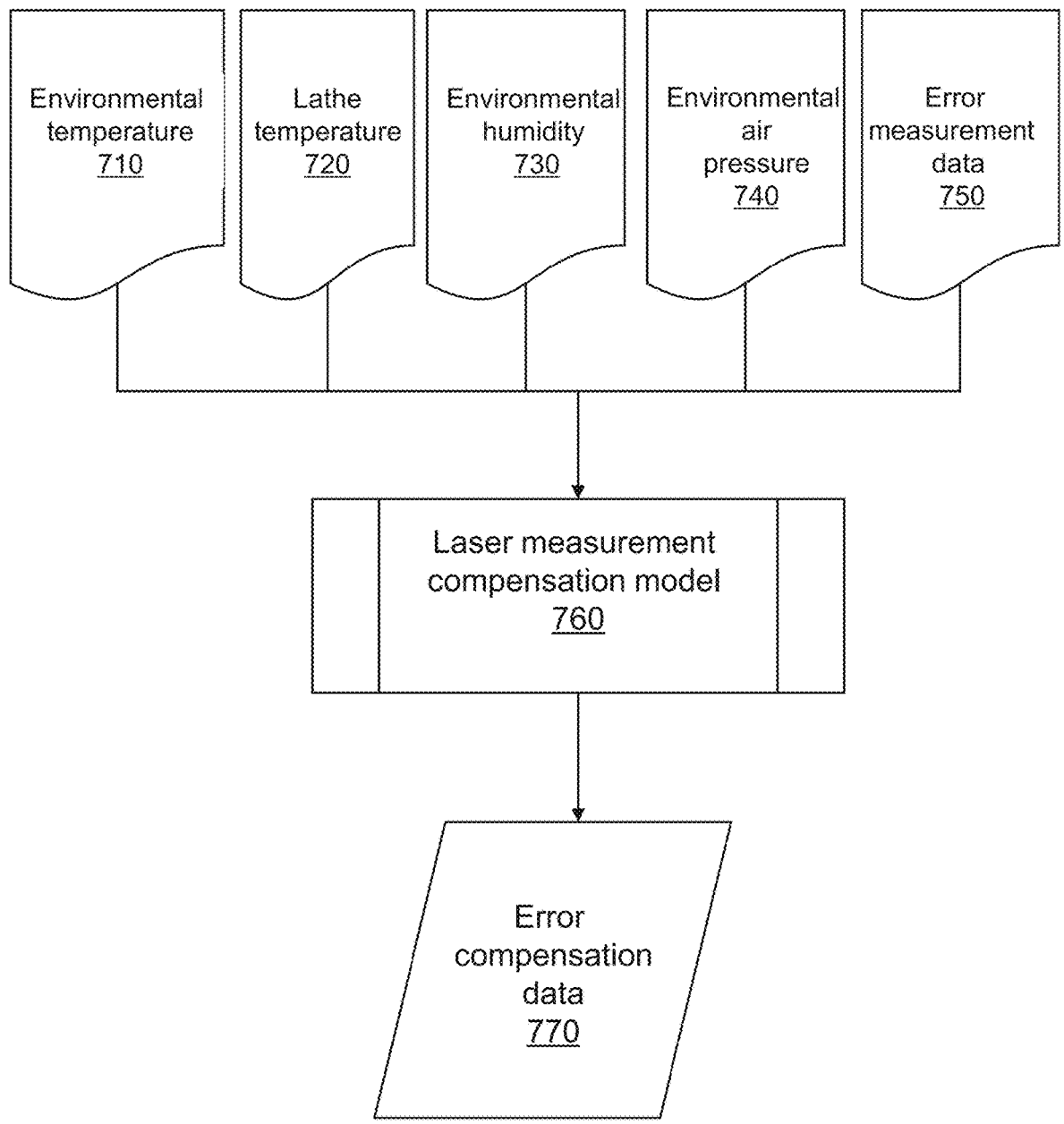
FIG. 7 is a schematic diagram illustrating an exemplary laser measurement compensation model according to some embodiments of the present disclosure.

FIG. 7 is a schematic diagram illustrating an exemplary laser measurement compensation model according to some embodiments of the present disclosure.

Temperature, humidity, pressure, etc. in different environments may affect a wavelength of a laser, thereby affecting a measurement result of the laser interferometer. In some embodiments, a processor may determine an environmental temperature 710 and a lathe temperature 720 based on a temperature sensor; determine an environmental humidity 730 based on a humidity sensor; determine an environmental air pressure 740 based on an air pressure sensor; determine error compensation data 770 of the laser interferometer based on the environmental temperature, the lathe temperature, the environmental humidity, the environmental air pressure and error measurement data 750 through a laser measurement compensation model 760. More descriptions about the laser interferometer may be found in FIG. 1 and the relevant descriptions thereof.

In some embodiments, the temperature sensor may be contact or non-contact, for example, the temperature sensor may include a contact thermistor thermometer, a non-contact infrared temperature sensor, etc.

In some embodiments, the humidity sensor may include a lithium chloride humidity sensor, an alumina hygrometer, etc.

In some embodiments, the air pressure sensor may include a digital air pressure sensor, an aneroid barometer, etc.

In some embodiments, the temperature sensor, the humidity sensor, and the air pressure sensor may be disposed around a measurement environment or on a related device. For example, the temperature sensor, the humidity sensor, and the air pressure sensor may be disposed on walls or corners of a room where the measurement is carried out, and may also be disposed on a numerically controlled machine tool.

In some embodiments, the error measurement data 750 refers to a set of initial positioning error data measured by the laser interferometer, for example, the error measurement data may be represented by a sequence of measurement values. The sequence of measurement values may include a set of initial positioning error data.

In some embodiments, the laser measurement compensation model 760 may be a machine learning model. For example, the laser measurement compensation model 760 may be a neural network model, a regression model, other custom model structures, or the like, or any combination thereof.

In some embodiments, an input of the laser measurement compensation model 760 may be the environmental temperature, the lathe temperature, the environmental humidity, the environmental air pressure, and the error measurement data, and an output of the laser measurement compensation model may be the error compensation data.

The error compensation data 770 refers to a set of positioning error data obtained after the initial positioning error data is compensated. The error compensation data is an optimized value of the positioning error data adjusted and compensated by the laser measurement compensation model. More descriptions about the positioning error data may be found in FIG. 1 and the related descriptions thereof.

The laser measurement compensation model 760 may be obtained through training. A first training sample includes a sample environmental temperature, a sample environmental humidity, a sample environmental air pressure, a sample lathe temperature, and sample error measurement data. A first label of the first training sample may be actual positioning error data corresponding to the first training sample. In some embodiments, the first label may be obtained through an actual value corresponding to the sample in historical data.

In some embodiments, the laser measurement compensation model may be obtained by training in a following way: inputting a plurality of first training samples with the first label into an initial laser measurement compensation model, constructing a loss function using the output of the initial laser measurement compensation model and the first label, iteratively updating the initial laser measurement compensation model based on the loss function, and completing the training of the laser measurement compensation model when the loss function of the initial laser measurement compensation model meets a preset condition. The preset condition may be that the loss function converges, a count of iterations reaches a set value, etc.

In some embodiments, the input of the laser measurement compensation model 760 may also include airflow data.

The airflow data refers to data related to airflow during the measurement.

In some embodiments, the airflow data may be determined by an airflow sensor. In some embodiments, the airflow sensor may include a hot wire airflow meter, a cup anemometer, etc. In some embodiments, the airflow sensor may be disposed around the measurement environment or on a related device.

In some embodiments, when the input of the laser measurement compensation model includes the airflow data, the first training sample may further include sample airflow data.

In some embodiments of the present disclosure, airflow may cause changes in air pressure at different locations, and the air pressure may affect a measurement result of the laser interferometer. Adding the airflow data to the input may make the error compensation data determined by the laser measurement compensation model more accurate, which is conducive to further improving the precision of the positioning error data determined by the laser interferometer.

In some embodiments of the present disclosure, when detection is performed using the laser interferometer, temperature, humidity, pressure, etc. in different environments may affect the wavelength of the laser, thereby affecting the measurement result of the laser interferometer. The processor obtains the error compensation data by compensating the measurement result through the laser measurement compensation model, which is beneficial to improving the precision of the positioning error data determined by the laser interferometer.

Figure 8:
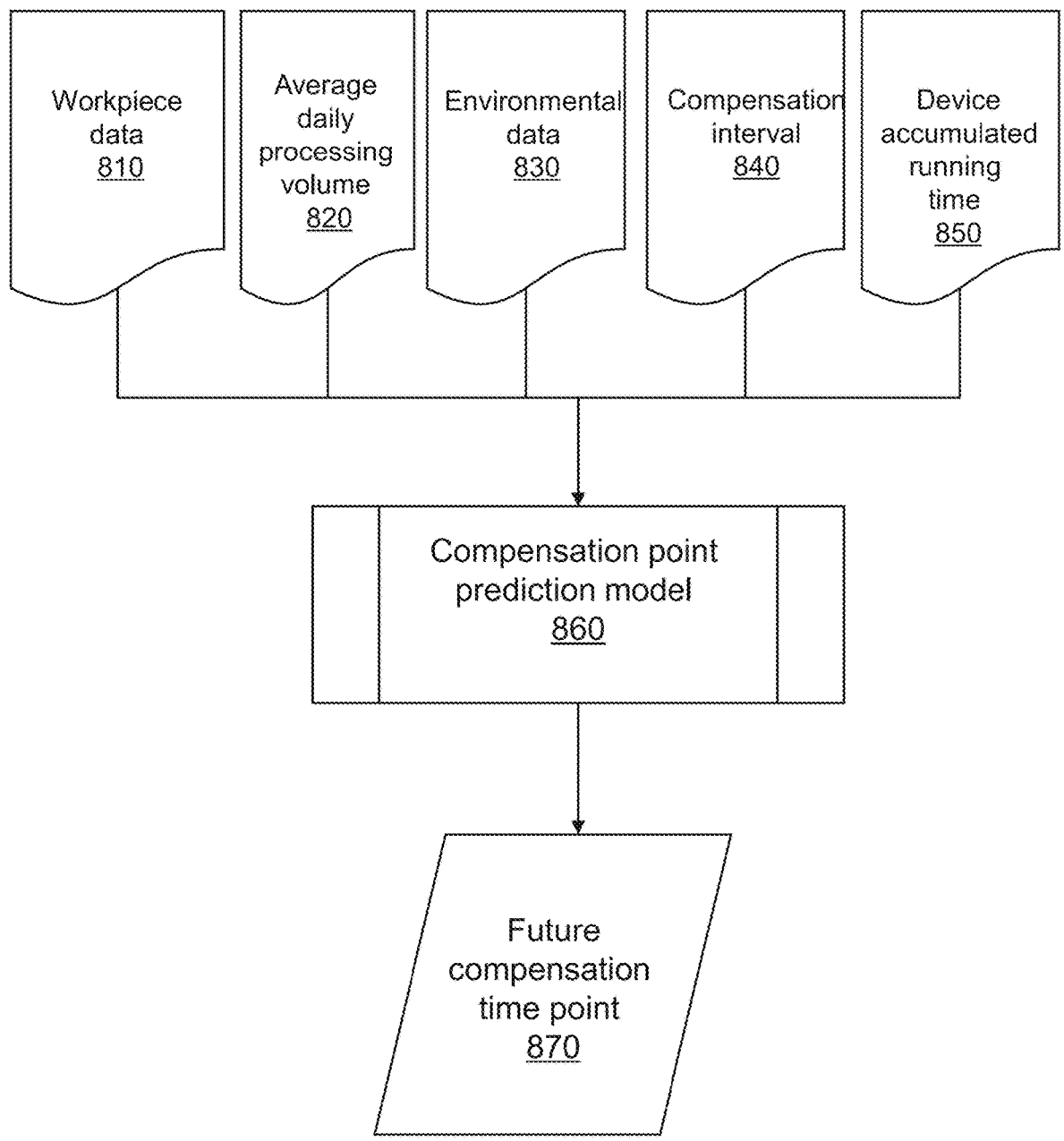
FIG. 8 is a schematic diagram illustrating an exemplary compensation point prediction model according to some embodiments of the present disclosure.

FIG. 8 is a schematic diagram illustrating an exemplary compensation point prediction model according to some embodiments of the present disclosure.

A periodic detection is a way of a fixed detection period, which is not necessarily accurate. For example, when an average daily processing volume in a fixed detection period is relatively large, due to problems such as machine tool wear and load, a count of workpieces produced in the fixed detection period that may not meet a standard may increase. In some embodiments, the periodic detection may be a non-fixed detection period, and a processor may determine the non-fixed detection period according to an actual condition. The processor may detect a volumetric positioning error of a transnational axis based on the non-fixed detection period, and may also predict a future compensation time point at which error compensation is performed.

The future compensation time point refers to a time point when the error compensation needs to be performed within a certain period of time in the future, for example, the error compensation needs to be performed on an $8^{th}$ day in the future. The processor may determine the non-fixed detection period based on the future compensation time point, for example, the non-fixed detection period is a period of time between a previous error compensation time point and the future compensation time point.

In some embodiments, the processor may determine the future compensation time point in a plurality of ways. For example, the processor may determine the future compensation time point by querying a first reference table. The first reference table may be determined based on prior knowledge or historical data, including at least one piece of historical yield data and a future compensation time point corresponding to each piece of historical yield data. The processor may determine the future compensation time point by querying the table based on current historical yield data. The historical yield data refers to yield data from the previous error compensation time point to a current time point.

In some embodiments of the present disclosure, a detection cycle is determined as the non-fixed detection period, which may prevent the occurrence of unqualified workpieces caused by positioning errors before a fixed detection time point. At the same time, the future compensation time point at which the error compensation performed may be predicted, which the error compensation may be performed in time, thereby ensuring a qualification rate of workpieces.

In some embodiments, the processor may determine a future compensation time point 870 through a compensation point prediction model 860 based on workpiece data 810, an average daily processing volume 820, environmental data 830, a compensation interval 840, and a device accumulated running time 850.

The compensation point prediction model 860 refers to a model used to determine the future time compensation point. In some embodiments, the compensation point prediction model may be a machine learning model. For example, the compensation point prediction model may include a convolutional neural network (CNN) model, a neural network (NN) model, or other custom model structures, or the like, or any combination thereof.

The workpiece data 810 refers to data related to production of workpieces, such as a workpiece material, a workpiece weight, and a processing manner. In some embodiments, the processor may obtain the workpiece data by querying a workpiece process specification.

In some embodiments, the workpiece data may include historical workpiece data and planned workpiece data. The historical workpiece data refers to workpiece data of processed workpieces from the previous error compensation time point to the current time point, and the planned processed workpiece data refers to workpiece data of workpieces planned to be processed in the future.

The average daily processing volume 820 may represent a count of processed workpieces produced each day. In some embodiments, the processor may obtain the average daily processing volume by querying a production schedule. In some embodiments, the average daily processing volume may include a historical average daily processing volume and a planned average daily processing volume.

The environmental data 830 may represent data of an environment in which a device is located. In some embodiments, the environmental data may include historical environmental data and current environmental data. In some embodiments, the processor may obtain the environmental data through an environmental monitoring device (e.g., a temperature sensor).

The compensation interval 840 refers to a time interval between current error compensation and previous error compensation. In some embodiments, the processor may obtain the compensation interval by calculating a difference between a current time and a previous error compensation time.

The device accumulated running time 850 refers to a total running time that a device has already been put into operation. In some embodiments, the processor may obtain the device accumulated running time by calculating a difference between the current time and a running time of the device.

In some embodiments, the processor may obtain the compensation point prediction model by training a large number of second training samples with second labels. The second training sample may include sample workpiece data, a sample average daily processing volume, sample environmental data, and a sample compensation interval. The second label of the second training sample may be an actual compensation time point corresponding to the sample data.

In some embodiments, a training process of the compensation point prediction model is similar to the training process of the laser measurement compensation model. More information about the training process may be found in FIG. 7 and the relevant descriptions thereof.

In some embodiments, the second training sample may be obtained based on historical data, and the second label of the second training sample may be determined based on manual labeling. For example, the processor may perform an error detection on the positioning error every day until detection data of a certain day exceeds an error threshold, that is, error compensation needs to be performed on the day, and the day is manually marked as a second label. The error threshold refers to a maximum error value allowed by the detection data. The processor may set the error threshold according to an actual need.

In some embodiments of the present disclosure, the future compensation time point may be determined through the compensation point prediction model based on the workpiece data, the average daily processing volume, the environmental data, the compensation interval, and the device accumulated running time, so that a more accurate future compensation time point may be obtained, and the error compensation may be performed after a reasonable time interval.

In some embodiments, the processor may determine the future compensation time point through the compensation point prediction model based on the workpiece data, the average daily processing volume, the environmental data, the compensation interval, and the device accumulated running time in response to a determination that the planned workpiece data and/or the planned average daily processing volume changes.

For example, if an original planned average daily processing volume is changed from 1,000 pieces to 2,000 pieces, the future compensation time point is re-determined through the compensation point prediction model based on the workpiece data, the average daily processing volume, the environmental data, the compensation interval, and the device accumulated running time. More descriptions about the compensation point prediction model may be found in the related description above.

In some embodiments of the present disclosure, in response to a determination that the planned workpiece data and/or the planned average daily processing volume changes, the future time compensation point may be re-determined through the compensation point prediction model, so that the future compensation time point can be dynamically updated and the error compensation can be performed in time.

Although the embodiments of the present disclosure have been shown and described, those skilled in the art can understand that various changes, modifications, substitutions, and variations can be made to these embodiments without departing from the principle and spirit of the present disclosure, and the scope of the present disclosure is limited by the claims and equivalents thereof.

What is claimed is:

1. A method for optimizing geometric error compensation data of a translational axis of a five-axis numerically controlled machine tool, wherein execution of the method is processor-based, comprising:

(1) establishing a volumetric positioning error model of a tool center point caused by a geometric error of the translational axis of the five-axis numerically controlled machine tool, wherein 18 geometric error vectors including three coordinate axes are: an X-direction positioning error $\delta_x(i)$, a Y-direction straightness error $\delta_y(i)$, a Z-direction straightness error $\delta_z(i)$, a roll error $\theta_\alpha(i)$, a pitch error $\theta_\beta(i)$, and a deflection error $\theta_\gamma(i)$, i=X, Y, Z, and X, Y, and Z denote operating positions of the coordinate axes within a travel range;

(2) establishing an error database of the 18 geometric error vectors including the three coordinate axes and the establishing an error database of the 18 geometric error vectors including the three coordinate axes includes:

(2.1) identifying the geometric error of the translational axis through a thirteen trajectory line detection manner using a high-precision laser interferometer based on the volumetric positioning error model of the five-axis numerically controlled machine tool established in the operation (1);

(2.2) combining six geometric errors identified for each axis into a form of an error vector:

$$E_{1\times 18} = [\underbrace{\delta_x(X), \ldots, \theta_\gamma(X)}_{six\ items}, \underbrace{\delta_x(Y), \ldots, \theta_\gamma(Y)}_{six\ items}, \underbrace{\delta_x(Z), \ldots, \theta_\gamma(Z)}_{six\ items}];\ and$$

(2.3) extending each error into a position-dependent vector throughout a whole motion travel since the 18 geometric errors of the translational axis are interrelated with a motion position and dividing the motion position into N equal parts, wherein same geometric errors at different positions are all different, and the error database of the translational axis of the numerically controlled machine tool is expressed as follows:

$$Ebase_{N\times 18} = \begin{bmatrix} \delta_x(X)_1, \ldots, \theta_\gamma(X)_1, \delta_x(Y)_1, \ldots, \theta_\gamma(Y)_1, \delta_x(Z)_1, \ldots, \theta_\gamma(Z)_1 \\ \ldots \\ \delta_x(X)_N, \ldots, \theta_\gamma(X)_N, \delta_x(Y)_N, \ldots, \theta_\gamma(Y)_N, \delta_x(Z)_N, \ldots, \theta_\gamma(Z)_N \end{bmatrix};$$

(3) constructing a volumetric error compensation table of a numerically controlled system;

(4) establishing a compensation data optimization model of a volumetric positioning error of the translational axis, adding correction coefficients k and d to the geometric error vectors obtained in the operation (2), and combining with a translational axis linkage trajectory positioning error model to form an optimization model of three face diagonals and one body diagonal in a translational axis linkage mode;

(4.1) adding the correction coefficients k and d to each error of the geometric error vectors obtained in the operation (2), wherein a basic form is as follows:

$e\_\text{Adjust}=ke+d$ where e denotes any one of the geometric error vectors, $e_{Adjust}$ denotes a corrected error, and an expression for correcting an entire geometric error vector is as follows:

$$Ebase\_Adjust_{N\times 18} = \begin{bmatrix} \underset{k_1,d_1}{\delta_x(X)_1}, \ldots, \theta_\gamma(X)_1, \delta_x(Y)_1, \ldots, \underset{k_i,d_i}{\theta_\gamma(Y)_1}, \delta_x(Z)_1, \ldots, \theta_\gamma(Z)_1 \\ \ldots \\ \underset{k_1,d_1}{\delta_x(X)_N}, \ldots, \theta_\gamma(X)_N, \delta_x(Y)_N, \ldots, \underset{k_i,d_i}{\theta_\gamma(Y)_N}, \delta_x(Z)_N, \ldots, \theta_\gamma(Z)_N \end{bmatrix}$$

where $Ebase_{Adjust}$ is a corrected error database of the translational axis, $k_i$ and $d_i$ denote the correction coefficients required for an $i^{th}$ error, a purpose of adding the correction coefficients is to realize a dynamic change of each error vector within a certain range, which refers to searching for upper and lower bounds by relying on the correction coefficients of $k_i$ and $d_i$, wherein $k_i$ completes scaling adjustment of data, and $d_i$ completes overall offset adjustment of the data to complete an approximation of a real error, and the adjustment is performed simultaneously on all the geometric errors to achieve accurate error compensation;

(4.2) calculating positioning errors of four diagonals of an XY plane, an XZ plane, a YZ plane, and an XYZ body according to an expression of the volumetric positioning error of the tool center point obtained in the operation (1);

(4.3) obtaining corrected positioning errors of the four diagonals by substituting the geometric error Ebase$_{Adjust}$ after the correction coefficients are added into the positioning errors of the four diagonals calculated in the operation (4.2);

(4.4) obtaining machine tool linkage trajectory detection positioning error data by directly detecting the positioning errors of three face diagonals and one body diagonal during linkage of the translational axis using the laser interferometer; and (4.5) calculating differences between the operation (4.3) and the operation (4.4), and obtaining four optimization objectives of the diagonals by taking a smallest sum of squared differences as an optimization objective;

(5) numerically solving vectors K and D composed of the correction coefficients k and d based on a particle swarm optimization algorithm to complete iterative optimization and selection of the correction coefficients;

(6) generating the volumetric error compensation table of the numerically controlled system by combining the correction coefficient vector obtained in the operation (5) and the geometric error vector with the operation (3) and completing compensation of the geometric errors of the five-axis numerically controlled machine tool; and (7) iterating error correction data to the error database in the operation (2), performing linkage trajectory detection on the volumetric positioning error of the translational axis by setting a fixed period, presetting a positioning error threshold, and cycling the operations (2) to (6) to realize a machine tool precision guarantee system for periodic detection, optimization, and compensation.

2. The method of claim 1, wherein the five-axis numerically controlled machine tool in the operation (1) is a CA double pendulum head vertical five-axis numerically controlled machine tool, and the volumetric positioning error model of the tool center point established with the five-axis numerically controlled machine tool is:

$$P_{error} = \begin{bmatrix} \delta_x(X) + \delta_x(Y) + \delta_x(Z) - L(\theta_\beta(X) + \theta_\beta(Y) + \theta_\beta(Z)) - \\ Y(\theta_\gamma(X) + \theta_\gamma(Y)) + Z(\theta_\beta(X) + \theta_\beta(Y) + \theta_\beta(Z)) \\ \delta_y(X) + \delta_y(Y) + \delta_y(Z) - L(\theta_\alpha(X) + \theta_\alpha(Y) + \theta_\alpha(Z)) + \\ X\theta_\gamma(X) - Z(\theta_\alpha(X) + \theta_\alpha(Y) + \theta_\alpha(Z)) \\ \delta_z(X) + \delta_z(Y) + \delta_z(Z) - X\theta_\beta(X) + Y(\theta_\alpha(X) + \theta_\alpha(Y)) \end{bmatrix}$$

$$= P_{error}(E(X), E(Y), E(Z))$$

where $E(i) = [\delta_x(i), \delta_y(i), \delta_z(i), \theta_\alpha(i), \theta_\beta(i), \theta_\gamma(i)]^T$, i=X, Y, Z, denoting a generalized form of the error vectors of the coordinate axes.

3. The method of claim 2, wherein in the operation (2.1), the identifying the geometric error of the translational axis through the thirteen trajectory line detection manner includes:

determining thirteen linkage trajectory lines in a workspace formed by the motion travel of the translational axis of the machine tool, each linkage trajectory line having a plurality of nodes, running the machine tool to make a spindle move along the thirteen linkage trajectory lines and record an ideal travel and an actual travel at each of the nodes; and modeling the geometric errors of the translational axes and calculating the geometric errors of the translational axes of the machine tool based on the ideal travel and the actual travel at the each of the nodes, wherein each of the linkage trajectory lines includes n+1 nodes, n is a natural number, and the linkage trajectory lines include:

three X-axis trajectory lines L1, L2, and L3 formed by three edges parallel to an X-axis on three surfaces of a co-vertex A of the workspace;

three Y-axis trajectory lines L4, L5, and L6 formed by three edges parallel to a Y-axis on three surfaces of the co-vertex A of the workspace;

three Z-axis trajectory lines L7, L8, and L9 formed by three edges parallel to a Z-axis on three surfaces of the co-vertex A of the workspace;

a linked trajectory line L10 of the X-axis and the Y-axis formed by a diagonal located on the XY plane on the three surfaces of the co-vertex A of the workspace;

a linked trajectory line L11 of the X-axis and the Z-axis formed by a diagonal located on the XZ plane on the three surfaces of the co-vertex A of the workspace;

a linked trajectory line L12 of the Y-axis and Z-axis formed by a diagonal located on the YZ plane on the three surfaces of the co-vertex A of the workspace; and a linked trajectory line L13 of the X-axis, Y-axis, and Z-axis formed by a diagonal passing through the vertex A of the workspace.

4. The method of claim 3, wherein in the operation (3), the constructing the volumetric error compensation table of the numerically controlled system includes:

(3.1) dividing the volumetric positioning error into two parts by analyzing a mathematical model between the volumetric positioning error and the geometric error of the tool center point, the two parts including a volumetric positioning error linear part and a volumetric positioning error nonlinear part, wherein the volumetric positioning error linear part, which refers to a linear part composed of geometric errors is related only to the coordinate axes, and the linear part includes a positioning error and a sag error; and the volumetric positioning error is affected by an interaction between the coordinate axes and the geometric error or between different geometric errors, so that the positioning error changes nonlinearly, and the nonlinear part is the sag error;

(3.2) according to a definition of the sag error of the numerically controlled system and a compensation specification of the sag error of the numerically controlled system, expressing the volumetric error compensation as follows:

$$(T_a^b)_i = \begin{cases} \$AN\_CEC\_[i, 0] = x_1, \\ \$AN\_CEC\_[i, 1] = x_2, \\ \ldots \ldots, \\ \$AN\_CEC\_[i, N] = x_N, \\ \$AN\_CEC\_INPUT\_AXIS[i] = a, \\ \$AN\_CEC\_OUTPUT\_AXIS[i] = b \end{cases},$$

where a denotes a reference coordinate axis, which refers to an input axis, b denotes a coordinate axis to be compensated, which refers to an output axis, i denotes an $i^{th}$ compensation table, N denotes N equal parts of the motion position on the reference coordinate axis, $(x_1, x_2, \ldots, x_N)$ denotes N error values of a certain error at the motion position, and \$AN_CEC_ is a special symbol of a compensation module of the numerically controlled system, wherein if a and b are defined as the same coordinate axes, $(T_a^b)_i$ denotes compensation of a single-axis positioning error; if a and b are defined as different coordinate axes, $(T_a^b)_i$ denotes compensation of the sag error between the coordinate axes; and (3.3) constructing the volumetric error compensation table of the numerically controlled system for the compensation of the translational axis positioning error and the sag error, wherein the linear part is rewritten as:

$$S(L_{error\_x}) = (T_x^x)_1 + (T_y^x)_2 + (T_z^x)_3 - L(T_x^x)_4 - L(T_y^x)_5 - L(T_z^x)_6$$

where $S(L_{error\_x})$ denotes the compensation table of the numerically controlled system; and
the nonlinear part is rewritten as:

$$S(N_{error\_x}) = T_z^x((T_x^x)_7 + (T_y^x)_8 + (T_z^x)_9) + T_y^x((T_x^x)_{10} + (T_y^x)_{11})$$

where $S(N_{error\_x})$ denotes the compensation table of the numerically controlled system.

5. The method of claim 4, wherein in the operation (4.2), the positioning errors of the four diagonals of the XY plane, the XZ plane, the YZ plane, and the XYZ body is calculated as follows, wherein (4.2.1) the positioning error of the diagonal of the XY plane is:

since the X and Y coordinate axes are involved in the motion when a positioning precision linkage inspection is performed on the diagonal of the XY plane, an XY linkage diagonal positioning error is related to the geometric error of the X and Y coordinate axes, the positioning error of the diagonal of the XY plane is expressed as follows:

$$P_{error\_XY} = \|P_{error}(E(X), E(Y))\|_{E(Z)=0, Z=0}$$

similarly, the positioning errors of the three diagonals of the XZ plane, the YZ plane, and the XYZ body are as follows:

(4.2.2) the positioning error of the diagonal of the XZ plane is:

$$P_{error\_XZ} = \|P_{error}(E(X), E(Z))\|_{E(Y)=0, Y=0}$$

(4.2.3) the positioning error of the diagonal of the YZ plane is:

$$P_{error\_YZ} = \|P_{error}(E(Y), E(Z))\|_{E(X)=0, X=0}$$

(4.2.4) the positioning error of the diagonal of the XYZ body is:

$$P_{error\_XYZ} = \|P_{error}(E(X), E(Y), E(Z))\|.$$

6. The method of claim 5, wherein in the operation (5), quickly optimizing the correction coefficients k and d based on the particle swarm optimization algorithm includes:

(5.1) implementing the particle swarm optimization algorithm, and
expressing a particle moving position during the optimization by a mathematical equation as:

$$x_i^{k+1} = x_i^k + v_i^{k+1}$$

where k denotes a count of iterations, and k≥0; $x_i$ denotes a position of an $i^{th}$ particle in space; and $v_i$ denotes a particle moving speed in multidimensional space and is expressed as:

$$v_i^{k+1} = w^k v_i^k + c_1 r_1 (p_i^k - x_i^k) + c_2 r_2 (g_i^k - x_i^k)$$

where $r_1$ and $r_2$ are random numbers between [0, 1]; $c_1$ and $c_2$ denote learning factors, usually, $c_1 = c_2 = 2$; and $w^k$ denotes an inertia weight, $p_i^k$ and $g_i^k$ denote an individual optimal value and a swarm optimal value at a $k^{th}$ iteration, respectively;

(5.2) setting an initial count of particle swarms, generating an initial position and an initial velocity vector within a range of correction coefficient, and saving an individual optimal value and a swarm optimal value at each iteration; and (5.3) setting a total count of iterations (hereinafter referred to as iterations) and an iteration precision (hereinafter referred to as tolerance) and executing the operation (5.2) for a new particle movement if the iterations does not reach an upper limit or the tolerance exceeds a given threshold, otherwise, stopping the iterations and outputting a saved particle position where a swarm optimal value is located, at this time the particle optimal position being the values of the coefficient vectors K and D.

7. The method of claim 6, wherein in the operation (6), the compensating the volumetric positioning error of the translational axis of the five-axis numerically controlled machine tool includes:

(6.1) generating a sag error compensation file with the correction coefficients according to the operation (3) and the operation (5):

$$(T_a^b)_{ij} = \begin{cases} \$AN\_CEC\_[i, 0] = k_j \cdot e_1 + b_j, \\ \$AN\_CEC\_[i, 1] = k_j \cdot e_2 + b_j, \\ \ldots \ldots, \\ \$AN\_CEC\_[i, N] = k_j \cdot e_N + b_j, \\ \$AN\_CEC\_INPUT\_AXIS[i] = a, \\ \$AN\_CEC\_OUTPUT\_AXIS[i] = b \end{cases},$$

where $(e_1, e_2, \ldots, e_N)$ denotes N error values of any one of the 18 geometric errors on the motion travel, and $k_j$ and $b_j$ denote corresponding correction coefficient values; and (6.2) combining the translational axis positioning error and sag error compensation table of the operation (3.3) and the corrected error database $Ebase_{Adjust}$ of the translational axis, and completing simultaneous compensation of the linear part and the nonlinear part of the positioning error of the tool center point of the numerically controlled machine tool based on the operation (6.1).

8. The method of claim 7, wherein in the operation (7), the guarantee system of periodic detection, optimization, and compensation includes:
- (7.1) setting the positioning error threshold and a fixed detection period, performing the linkage trajectory detection on the volumetric positioning error of the translational axis of the numerically controlled machine tool, and continuing to use the translational axis of the numerically controlled machine tool if the volumetric positioning error does not exceed the positioning error threshold, otherwise executing the operation (7.2); and
- (7.2) taking most recent geometric error compensation data as a new error database, and cycling the operations (2) to (6) to re-compensate with the most recent geometric error compensation data, and forming a volumetric positioning error guarantee system that integrates periodic detection, optimization, and compensation.

\* \* \* \* \*